United States Patent
Awoniyi-Oteri et al.

(10) Patent No.: US 12,101,767 B2
(45) Date of Patent: Sep. 24, 2024

(54) BLOCK FEEDBACK WITH VARIABLE FEEDBACK TIMING FOR SEMI-PERSISTENT SCHEDULING

(71) Applicant: QUALCOMM Incorporated, San Diego, CA (US)

(72) Inventors: Olufunmilola Omolade Awoniyi-Oteri, San Diego, CA (US); Jelena Damnjanovic, Del Mar, CA (US); Mostafa Khoshnevisan, San Diego, CA (US); Tao Luo, San Diego, CA (US); Xiaoxia Zhang, San Diego, CA (US); Jing Sun, San Diego, CA (US); Yisheng Xue, San Diego, CA (US); Iyab Issam Sakhnini, San Diego, CA (US); Sony Akkarakaran, Poway, CA (US); Yan Zhou, San Diego, CA (US); Junyi Li, Fairless Hills, PA (US); Ozcan Ozturk, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 47 days.

(21) Appl. No.: 17/313,632

(22) Filed: May 6, 2021

(65) Prior Publication Data

US 2021/0360668 A1 Nov. 18, 2021

Related U.S. Application Data

(60) Provisional application No. 63/025,938, filed on May 15, 2020.

(51) Int. Cl.
*H04W 72/1273* (2023.01)
*H04L 1/1822* (2023.01)
(Continued)

(52) U.S. Cl.
CPC ....... *H04W 72/1273* (2013.01); *H04L 1/1896* (2013.01); *H04W 72/1268* (2013.01); *H04W 72/23* (2023.01); *H04W 72/535* (2023.01)

(58) Field of Classification Search
CPC ......... H04W 72/1273; H04W 72/1257; H04W 72/1268; H04W 72/1289; H04L 1/1896
(Continued)

(56) References Cited

U.S. PATENT DOCUMENTS

| 2019/0297647 A1 | 9/2019 | Zhang et al. |
| 2020/0053744 A1 | 2/2020 | Hosseini et al. |

(Continued)

FOREIGN PATENT DOCUMENTS

| CN | 106160959 A | 11/2016 | |
| WO | WO-2021146702 A1 * | 7/2021 | ........... H04L 1/1819 |

OTHER PUBLICATIONS

ZTE, "Other enhancements for Rel-16 URLLC", 3GPP TSG RAN WG1 #99, R1-1911969, Nov. 18-22, 2019 (Year: 2019).*
Nokia et al,Support for SPS periodicities below a slot, R1-1906758, 3GPP TSG RAN WG1 Meeting #97, May 13-17, 2019 (Year: 2019).*
Wilus R1-1913071 ("Remaining Issues on SPS PDSCH for NR URLLC", Nov. 18-22, 2019) (Year: 2019).*
International Search Report and Written Opinion—PCT/US2021/031418—ISA/EPO—Aug. 2, 2021 (204605WO).

(Continued)

*Primary Examiner* — Xuan Lu
(74) *Attorney, Agent, or Firm* — Guang Yu Zhang; Holland & Hart LLP

(57) ABSTRACT

Methods, systems, and devices for wireless communications are described for block feedback of multiple semi-persistent scheduling (SPS) occasions. Block feedback may be provided based on variable feedback timing values that are associated with one or more SPS occasions. A user equipment (UE) may determine feedback for each of two or more SPS occasions, and transmit a block feedback that indicates the feedback. A separate feedback timing between a SPS occasion and uplink feedback resources may be provided for multiple SPS occasions, which are associated with a single uplink feedback resource. Alternatively, a minimum feed- (Continued)

back timing value and a maximum feedback timing value may be configured for a particular uplink resource, and block feedback for multiple SPS occasions within the minimum and maximum feedback timing values may be reported in the uplink feedback resource.

29 Claims, 21 Drawing Sheets

(51) Int. Cl.
| | | |
|---|---|---|
| *H04L 1/1829* | (2023.01) | |
| *H04L 1/1867* | (2023.01) | |
| *H04W 72/1268* | (2023.01) | |
| *H04W 72/23* | (2023.01) | |
| *H04W 72/50* | (2023.01) | |

(58) Field of Classification Search
USPC .......................................................... 370/329
See application file for complete search history.

(56) References Cited

U.S. PATENT DOCUMENTS

| | | | |
|---|---|---|---|
| 2021/0014791 A1* | 1/2021 | Freda ................ | H04W 52/0216 |
| 2022/0007399 A1* | 1/2022 | Rastegardoost ...... | H04L 5/0055 |
| 2022/0159692 A1* | 5/2022 | Lee ....................... | H04L 1/1864 |
| 2022/0174666 A1* | 6/2022 | Kou .................. | H04W 72/0453 |
| 2022/0232564 A1* | 7/2022 | Behravan .............. | H04L 1/1896 |
| 2022/0377796 A1* | 11/2022 | Jung ..................... | H04L 1/1864 |
| 2023/0041764 A1* | 2/2023 | Park ..................... | H04L 5/0053 |

OTHER PUBLICATIONS

Nokia, et al., "Support for SPS Periodicities Below a Slot," 3GPP Draft, 3GPP TSG RAN WG1 Meeting #97, R1-1906758_HARQ Impact of Short SPS_Final, 3rd Generation Partnership Project (3GPP), Mobile Competence Centre, 650, Route Des Lucioles, F-06921 Sophia-Antipolis Cedex, France, vol. RAN WG1, No. Reno, NV, USA, May 13, 2019-May 17, 2019, May 13, 2019 (May 13, 2019), 8 Pages, XP051728209, Retrieved from the Internet: URL: http://www.3gpp.org/ftp/Meetings%5F3GPP%5FSYNC/RAN1/Docs/R1%2D1906758%2Ezip [retrieved on May 13, 2019], pp. 3-6, p. 2, Paragraph 2.1—p. 5; figures 1, 2.

NTT Docomo Inc., "Discussions on DL SPS Enhancement," 3GPP Draft, 3GPP TSG RAN WG1 #99, R1-1912891, 3rd Generation Partnership Project (3GPP), Mobile Competence Centre, 650, Route Des Lucioles, F-06921, Sophia-Antipolis Cedex, France, vol. RAN WG1, No. Reno, USA; Nov. 18, 2019-Nov. 22, 2019, Nov. 9, 2019 (Nov. 9, 2019), XP051823670, pp. 1-9, Retrieved from the Internet: URL: https://ftp.3gpp.org/tsg_ran/WG1_RL1/TSGR1_99/Docs/R1-1912891.zip R1-1912891.docx [retrieved on Nov. 9, 2019] Sections 2-3, pp. 5-7, pp. 6-7.

ZTE: "Other Enhancements for Rel-16 URLLC," 3GPP Draft, 3GPP TSG RAN WG1 #99, R1-1911969, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 9, 2019 (Nov. 9, 2019), XP051823150, 4 pages, Retrieved from the Internet: URL: https://ftp.3gpp.org/tsg_ran/WG1_RL1/TSGR1_99/Docs/R1-1911969.zip R1-1911969 Other enhancements for Rel-16 URLLC. docx [retrieved on Nov. 9, 2019] pp. 1-2.

* cited by examiner

BLOCK FEEDBACK WITH VARIABLE FEEDBACK TIMING FOR SEMI-PERSISTENT SCHEDULING

CROSS REFERENCE

The present Application for Patent claims the benefit of U.S. Provisional Patent Application No. 63/025,938 by Awoniyi-Oteri et al., entitled "BLOCK FEEDBACK WITH VARIABLE FEEDBACK TIMING FOR SEMI-PERSISTENT SCHEDULING," filed May 15, 2020, assigned to the assignee hereof, and expressly incorporated by reference herein.

FIELD OF TECHNOLOGY

The following relates generally to wireless communications and more specifically to block feedback with variable feedback timing for semi-persistent scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support semi-persistent scheduling (SPS) in which a wireless device (e.g., a UE) may be configured with a set of recurring resources for receiving or transmitting communications. Such SPS configurations may reduce overhead by allowing for communications in the absence of control channel communications associated with each occasion of a resource. Further, some wireless communications system may support acknowledgment/negative-acknowledgment (ACK/NACK) feedback (e.g., hybrid automatic repeat request (HARQ) ACK/NACK feedback) to indicate if a wireless device (e.g., a UE) successfully decodes communications. Techniques to enhance system performance for SPS and ACK/NACK feedback may be desirable in order to enhance network efficiency and reliability.

SUMMARY

The described techniques relate to improved methods, systems, devices, and apparatuses that support block feedback techniques for semi-persistent scheduling. In various aspects, described techniques provide for block feedback of multiple semi-persistent scheduling (SPS) occasions based on variable feedback timing values that are associated with one or more SPS occasions. In some cases, a base station may provide a user equipment (UE) with a block feedback SPS configuration that includes resources for a number of SPS occasions that are scheduled for downlink communications from the base station to the UE. The UE may determine feedback for each SPS occasion (e.g., hybrid automatic repeat request (HARQ) acknowledgment/negative-acknowledgment (ACK/NACK) feedback), and transmit a block feedback that indicates ACK/NACK for each of multiple SPS occasions. In some cases, a separate feedback timing between a SPS occasion and uplink feedback resources may be provided for multiple SPS occasions, which are associated with a single uplink feedback resource that provides the block feedback. In some cases, a minimum feedback timing value and a maximum feedback timing value may be configured for a particular uplink resource, and block feedback for multiple SPS occasions within the minimum and maximum feedback timing values may be reported in the uplink feedback resource.

A method of wireless communication at a UE is described. The method may include receiving, from a base station, a semi-persistent scheduling configuration for a set of semi-persistent scheduling occasions that are scheduled for downlink communications from the base station to the UE, identifying two or more feedback timings for transmission of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station, determining feedback for each of the one or more semi-persistent scheduling occasions, and transmitting a block feedback in the uplink resource that indicates the feedback for each of the one or more semi-persistent scheduling occasions.

An apparatus for wireless communication at a UE is described. The apparatus may include a processor, memory coupled with the processor, and instructions stored in the memory. The instructions may be executable by the processor to cause the apparatus to receive, from a base station, a semi-persistent scheduling configuration for a set of semi-persistent scheduling occasions that are scheduled for downlink communications from the base station to the UE, identify two or more feedback timings for transmission of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station, determine feedback for each of the one or more semi-persistent scheduling occasions, and transmit a block feedback in the uplink resource that indicates the feedback for each of the one or more semi-persistent scheduling occasions.

Another apparatus for wireless communication at a UE is described. The apparatus may include means for receiving, from a base station, a semi-persistent scheduling configuration for a set of semi-persistent scheduling occasions that are scheduled for downlink communications from the base station to the UE, identifying two or more feedback timings for transmission of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station, determining feedback for each of the one or more semi-persistent scheduling occasions, and transmitting a block feedback in the uplink resource that indicates the feedback for each of the one or more semi-persistent scheduling occasions.

A non-transitory computer-readable medium storing code for wireless communication at a UE is described. The code may include instructions executable by a processor to receive, from a base station, a semi-persistent scheduling configuration for a set of semi-persistent scheduling occasions that are scheduled for downlink communications from the base station to the UE, identify two or more feedback timings for transmission of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station, determine feedback for each of the one or more semi-persistent scheduling occasions, and transmit a block feedback in the uplink resource that indicates the feedback for each of the one or more semi-persistent scheduling occasions.

In some examples of the method, apparatuses, and non-transitory computer-readable medium described herein, the receiving further may include operations, features, means, or instructions for receiving a separate feedback timing for each semi-persistent scheduling occasion within a feedback window associated with the uplink resource. In some examples of the method, apparatuses, and non-transitory computer-readable medium described herein, a set of different feedback timings are configured in RRC signaling.

Some examples of the method, apparatuses, and non-transitory computer-readable medium described herein may further include operations, features, means, or instructions for receiving an activation DCI communication from the base station that activates the semi-persistent scheduling configuration and indicates which of the set of different feedback timings are to be used for each semi-persistent scheduling occasion within a feedback window that includes the two or more semi-persistent scheduling occasions. Some examples of the method, apparatuses, and non-transitory computer-readable medium described herein may further include operations, features, means, or instructions for receiving, from the base station, periodic updates to the feedback timings for two or more semi-persistent scheduling occasions within the feedback window.

Some examples of the method, apparatuses, and non-transitory computer-readable medium described herein may further include operations, features, means, or instructions for receiving a DCI communication from the base station that indicates the uplink resource and that indicates the two or more feedback timings for two or more semi-persistent scheduling occasions that are to be reported in the uplink resource. In some examples of the method, apparatuses, and non-transitory computer-readable medium described herein, the block feedback indicates feedback only for semi-persistent scheduling occasions that have negative-acknowledgment feedback.

In some examples of the method, apparatuses, and non-transitory computer-readable medium described herein, the receiving further may include operations, features, means, or instructions for identifying a minimum feedback timing value and a maximum feedback timing value from the two or more feedback timings, and where semi-persistent scheduling occasions within the minimum and the maximum feedback timing values are reported in an earliest uplink resource that is available for block feedback. In some examples of the method, apparatuses, and non-transitory computer-readable medium described herein, the minimum feedback timing value and the maximum feedback timing value are received in radio resource control signaling, and where the block feedback is transmitted for semi-persistent scheduling occasions within the minimum feedback timing value and the maximum feedback timing value of the earliest uplink resource. In some examples of the method, apparatuses, and non-transitory computer-readable medium described herein, the earliest uplink resource is a configured block feedback resource for a group of semi-persistent scheduling occasions or uplink resources associated with a different feedback communication of a dynamically configured uplink resource.

In some examples of the method, apparatuses, and non-transitory computer-readable medium described herein, a set of minimum feedback timing values and maximum feedback timing values are configured at the UE and a downlink control information communication from the base station activates one of the set of minimum feedback timing values and maximum feedback timing values. Some examples of the method, apparatuses, and non-transitory computer-readable medium described herein may further include operations, features, means, or instructions for receiving, from the base station, a downlink control information communication that provides an uplink grant associated with the uplink resource when a set of configured uplink resources are unavailable before the maximum feedback timing value of an earliest semi-persistent scheduling occasion that has unreported feedback.

In some examples of the method, apparatuses, and non-transitory computer-readable medium described herein, the block feedback has a fixed payload size based on a number of semi-persistent scheduling occasions with feedback reported in the block feedback. In some examples of the method, apparatuses, and non-transitory computer-readable medium described herein, the block feedback has a variable payload size based on a number of negative acknowledgments to be reported in the block feedback. In some examples of the method, apparatuses, and non-transitory computer-readable medium described herein, the block feedback is activated, reconfigured, or deactivated based on an indication provided in a medium access control (MAC) control element or in physical layer signaling from the base station.

A method of wireless communication at a base station is described. The method may include transmitting, to a UE, a semi-persistent scheduling configuration for a set of semi-persistent scheduling occasions that are scheduled for downlink communications from the base station to the UE, identifying two or more feedback timings for reception of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station, and receiving, from the UE, a block feedback in the uplink resource that indicates feedback for each of the two or more semi-persistent scheduling occasions.

An apparatus for wireless communication at a base station is described. The apparatus may include a processor, memory coupled with the processor, and instructions stored in the memory. The instructions may be executable by the processor to cause the apparatus to transmit, to a UE, a semi-persistent scheduling configuration for a set of semi-persistent scheduling occasions that are scheduled for downlink communications from the base station to the UE, identify two or more feedback timings for reception of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station, and receive, from the UE, a block feedback in the uplink resource that indicates feedback for each of the two or more semi-persistent scheduling occasions.

Another apparatus for wireless communication at a base station is described. The apparatus may include means for transmitting, to a UE, a semi-persistent scheduling configuration for a set of semi-persistent scheduling occasions that are scheduled for downlink communications from the base station to the UE, identifying two or more feedback timings for reception of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station, and receiving, from the UE, a block feedback in the uplink resource that indicates feedback for each of the two or more semi-persistent scheduling occasions.

A non-transitory computer-readable medium storing code for wireless communication at a base station is described. The code may include instructions executable by a processor to transmit, to a UE, a semi-persistent scheduling configuration for a set of semi-persistent scheduling occasions that are scheduled for downlink communications from the base station to the UE, identify two or more feedback timings for reception of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station, and receive, from the UE, a block feedback in the uplink resource that indicates feedback for each of the two or more semi-persistent scheduling occasions.

In some examples of the method, apparatuses, and non-transitory computer-readable medium described herein, the transmitting further may include operations, features, means, or instructions for providing a separate feedback timing for each semi-persistent scheduling occasion within a feedback window associated with the uplink resource. In some examples of the method, apparatuses, and non-transitory computer-readable medium described herein, a set of different feedback timings is configured in RRC signaling.

Some examples of the method, apparatuses, and non-transitory computer-readable medium described herein may further include operations, features, means, or instructions for transmitting an activation DCI communication to the UE that activates the semi-persistent scheduling configuration and indicates which of the set of different feedback timings are to be used for each semi-persistent scheduling occasion within a feedback window that includes two or more semi-persistent scheduling occasions. Some examples of the method, apparatuses, and non-transitory computer-readable medium described herein may further include operations, features, means, or instructions for transmitting, to the UE, periodic updates to the feedback timings for two or more semi-persistent scheduling occasions within the feedback window. Some examples of the method, apparatuses, and non-transitory computer-readable medium described herein may further include operations, features, means, or instructions for transmitting a DCI communication to the UE that indicates the uplink resource and that indicates the two or more feedback timings for two or more semi-persistent scheduling occasions that are to be reported in the uplink resource. In some examples of the method, apparatuses, and non-transitory computer-readable medium described herein, the block feedback indicates feedback only for semi-persistent scheduling occasions that have negative-acknowledgment feedback.

In some examples of the method, apparatuses, and non-transitory computer-readable medium described herein, the transmitting further may include operations, features, means, or instructions for providing a minimum feedback timing value and a maximum feedback timing value, and where semi-persistent scheduling occasions within the minimum and the maximum feedback timing values are reported in an earliest uplink resource that is available for block feedback. In some examples of the method, apparatuses, and non-transitory computer-readable medium described herein, the minimum feedback timing value and the maximum feedback timing value are configured in radio resource control signaling, and where the block feedback is transmitted for semi-persistent scheduling occasions within the minimum feedback timing value and the maximum feedback timing value of the earliest uplink resource. In some examples of the method, apparatuses, and non-transitory computer-readable medium described herein, the earliest uplink resource is a configured block feedback resource for a group of semi-persistent scheduling occasions or uplink resources associated with a different feedback communication of a dynamically configured uplink resource. In some examples of the method, apparatuses, and non-transitory computer-readable medium described herein, a set of minimum feedback timing values and maximum feedback timing values are configured at the UE and a downlink control information communication to the UE activates one of the set of minimum feedback timing values and maximum feedback timing values. Some examples of the method, apparatuses, and non-transitory computer-readable medium described herein may further include operations, features, means, or instructions for transmitting, to the UE, a downlink control information communication that provides an uplink grant associated with the uplink resource when a set of configured uplink resources are unavailable before the maximum feedback timing value of an earliest semi-persistent scheduling occasion that has unreported feedback.

In some examples of the method, apparatuses, and non-transitory computer-readable medium described herein, the block feedback has a fixed payload size based on a number of semi-persistent scheduling occasions with feedback reported in the block feedback. In some examples of the method, apparatuses, and non-transitory computer-readable medium described herein, the block feedback has a variable payload size based on a number of negative acknowledgments to be reported in the block feedback. In some examples of the method, apparatuses, and non-transitory computer-readable medium described herein, the block feedback is activated, reconfigured, or deactivated based on an indication provided in a medium access control (MAC) control element or in physical layer signaling from the base station.

DETAILED DESCRIPTION

Figure 1:
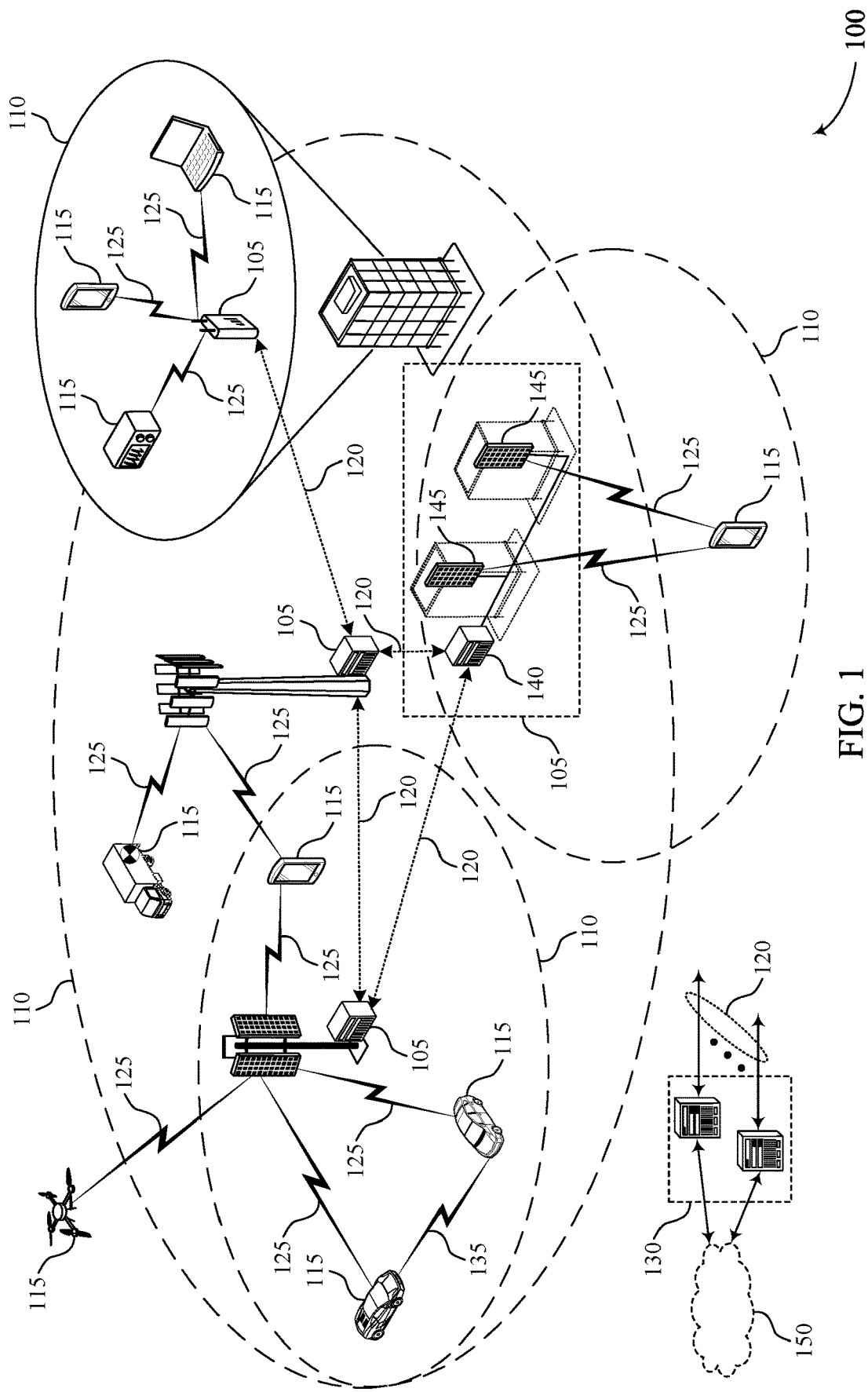
FIG. 1 illustrates an example of a system for wireless communications that supports block feedback with variable feedback timing for semi-persistent scheduling in accordance with aspects of the present disclosure.

Various described aspects of the disclosure relate to improved methods, systems, devices, or apparatuses that facilitate feedback for communications, such as hybrid automatic repeat request (HARQ) acknowledgment/negative-acknowledgment (ACK/NACK) feedback reports, in systems that use semi-persistent scheduling (SPS). In some examples, the techniques described herein enable efficient block feedback reporting of multiple SPS occasions based on variable feedback timings associated with multiple SPS occasions that indicate an uplink resource for block feedback communication.

In some cases, a base station may provide a user equipment (UE) with a block feedback SPS configuration that includes resources for a number of SPS occasions that are scheduled for downlink communications from the base station to the UE. The UE may determine feedback for each SPS occasion (e.g., HARQ ACK/NACK feedback), and transmit a block feedback that indicates ACK/NACK for each of multiple SPS occasions. In some cases, a separate feedback timing between a SPS occasion and uplink feedback resources may be provided for multiple SPS occasions, which are associated with a single uplink feedback resource that provides the block feedback. Thus, multiple SPS occasions of a SPS configuration may have different K1 values, which may be used to identify a feedback window with the multiple SPS occasions that are to have feedback reported in the block feedback. In some cases, the SPS configuration may indicate periodic resources that occur after a number of SPS occasions, and thus the block feedback is periodically transmitted for the number of SPS occasions. In some cases, a minimum feedback timing value and a maximum feedback timing value may be configured for a particular uplink resource, and block feedback for multiple SPS occasions within the minimum and maximum feedback timing values may be reported in the uplink feedback resource. In such cases, the minimum and maximum feedback timing values may define the feedback window.

The block feedback may include, in some cases, a separate ACK/NACK indication for each SPS occasion within the feedback window. In other cases, the block feedback may indicate only NACK feedback for SPS occasions that were unsuccessfully decoded at the UE, and in such cases the base station may perform blind decoding for multiple different sizes of the block feedback report. In some cases, the size of the feedback window may be determined based on one or more factors, such as a delay sensitivity associated with the downlink communications, a number of HARQ processes associated with the block feedback, a periodicity of the SPS occasions, or any combinations thereof.

Relative to conventional deployments in which each SPS occasion has associated uplink resources, block feedback techniques may provide a number of advantages and benefits including, for example, reduced resource overhead because feedback is not provided for each SPS occasion. Further, such techniques may allow for reduced power consumption based on fewer uplink communications to the base station from the UE. Additionally, such techniques may provide for reduced uplink interference relative to per-SPS occasion feedback that can result in co-channel interference or adjacent channel interference. Moreover, in some cases, block feedback techniques as discussed herein may provide for improved per-bit link efficiency, more diverse modulation and coding schemes (MCSs) and larger coding gain, reduced uplink loading level, reduced UE power consumption, or any combinations thereof, relative to per-SPS occasion feedback.

Such techniques may also provide a number of advantages and benefits for deployments that may use reduced capability UEs (e.g., NR-light UEs). In such cases, a base station may need to support a relatively large number of UEs, and hence the capacity of the downlink control channel can be a constraint, which can be alleviated to some extent through SPS configurations. Such reduced capability UEs may also be sensitive to power consumption and may carry diverse traffic types including some traffic that may be relatively latency tolerant and others that are relatively sensitive to latency. Thus, using block feedback SPS configurations can allow for SPS allocations of multiple traffic channels and block feedback for multiple SPS occasions of multiple different SPS configurations, thereby reducing control channel overhead and reducing UE power consumption.

Aspects of the disclosure are initially described in the context of wireless communications systems. Various examples of SPS occasions and associated feedback resources and feedback techniques are then discussed. Aspects of the disclosure are further illustrated by and described with reference to apparatus diagrams, system diagrams, and flowcharts that relate to block feedback with variable feedback timing for semi-persistent scheduling.

FIG. 1 illustrates an example of a wireless communications system 100 that supports block feedback with variable feedback timing for semi-persistent scheduling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, base stations 105 and UEs 115 may use SPS configurations for some communications. In some cases, block feedback of multiple SPS occasions may be provided as discussed herein. In some cases, block feedback of multiple SPS occasions in a single feedback communication may be based on variable feedback timings that are associated with each of multiple SPS occasions, such that multiple feedback indications of multiple SPS occasions are reported in block feedback in a same uplink resource. In some cases, the UE 115 may determine feedback for each SPS occasion (e.g., HARQ ACK/NACK feedback), and transmit a block feedback that indicates ACK/NACK for each of the SPS occasions based on two or more indicated feedback timings. In some cases, a separate feedback timing may be provided for each of two or more SPS occasions that indicates associated feedback from the two or more SPS occasions is to be transmitted in a same uplink resource. In some cases, a maximum feedback timing and a minimum feedback timing may be indicated to the UE and one or more SPS occasions that are within the maximum feedback timing and the minimum feedback timing prior to the uplink resource may be included in block feedback transmitted in the uplink resource.

Figure 2:
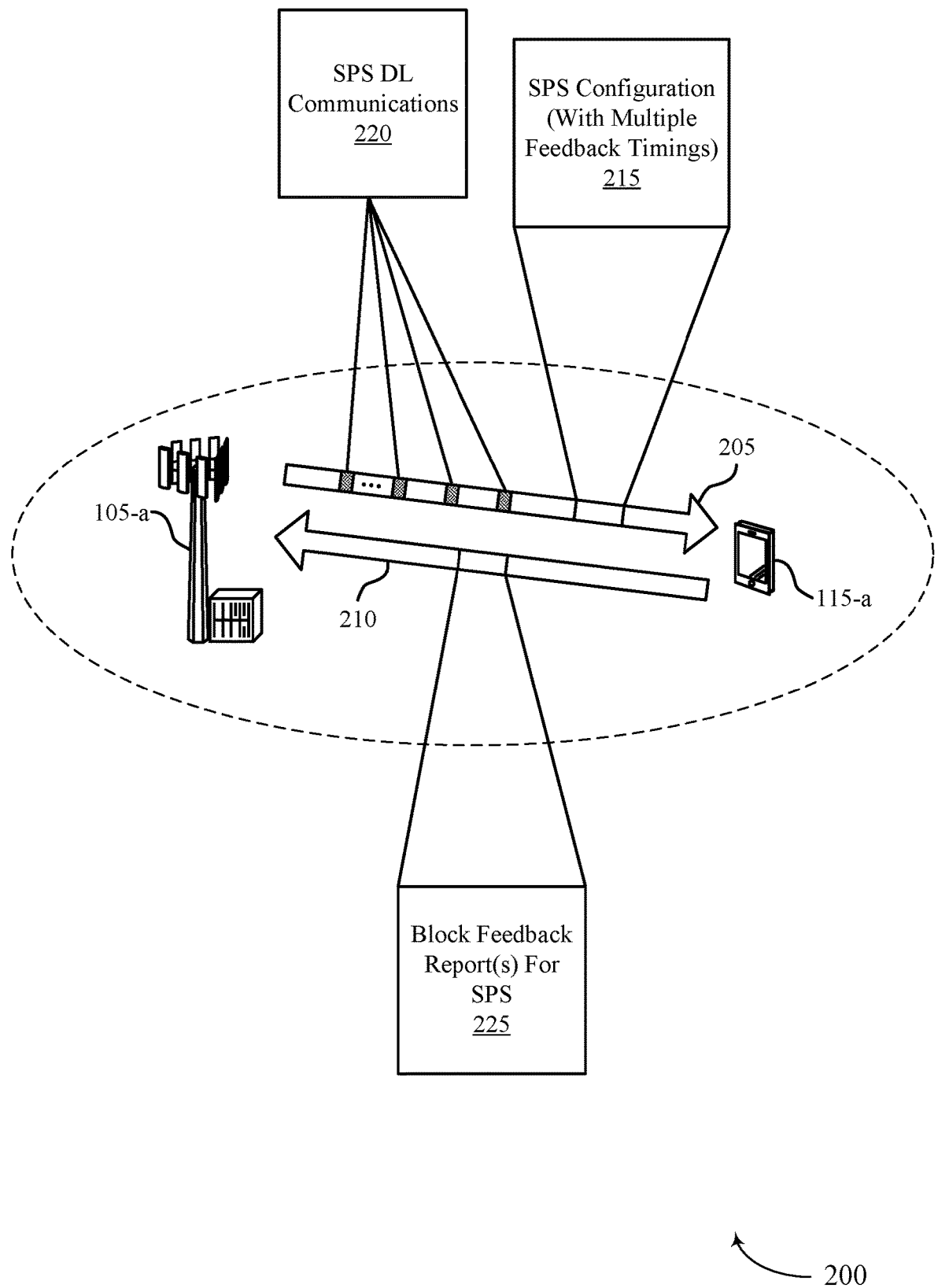
FIG. 2 illustrates an example of a portion of a wireless communications system that supports block feedback with variable feedback timing for semi-persistent scheduling in accordance with aspects of the present disclosure.

FIG. 2 illustrates an example of a wireless communications system 200 that supports block feedback with variable feedback timing for semi-persistent scheduling in accordance with aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115 as described with reference to FIG. 1.

As described herein, base station 105-a and UE 115-a may employ HARQ feedback techniques to indicate whether data has been received correctly at UE 115-a, in which block feedback may be provided from multiple SPS occasions. For example, base station 105-a may transmit a SPS configuration 215 to UE 115-a on resources of a carrier 205. The base station 105-a may also transmit multiple SPS downlink communications 220 to the UE 115-a on a number of SPS occasions using resources of carrier 205. Based on the SPS configuration 215, the UE 115-a may transmit, on resources of a carrier 210, one or more block feedback reports for SPS 225 to the base station 105-a that indicate whether SPS downlink communications 220 of two or more SPS communications within a feedback window were received and decoded correctly. In some cases, carriers 205 and 210 may be the same carrier. In some cases, carriers 205 and 210 may be component carriers (CCs), and a number of different CCs may be used for communications between the UE 115-a and the base station 105-a. In some cases, carriers 205 and 210 may use licensed spectrum, shared or unlicensed spectrum, or combinations thereof. When using unlicensed or shared spectrum, the UE 115-a and base station 105-a may use a contention-based access technique (e.g., a listen before talk (LBT) procedure) to determine if a channel is available prior to initiating transmissions.

The block feedback report(s) for SPS 225 may include, in some cases, a separate ACK/NACK indication for each SPS occasion that is reported in the block feedback. In other cases, the block feedback report(s) for SPS 225 may indicate only NACK feedback for SPS occasions that were unsuccessfully decoded at the UE, and in such cases the base station 105-a may perform blind decoding for multiple different sizes of feedback reports to successfully decode the block feedback report(s) for SPS 225. Examples of feedback reports are discussed in more detail with respect to the examples of FIGS. 4 and 5. In some cases, the SPS occasions to be reported in a block feedback are determined based on two or more different feedback timings that are provided with the SPS configuration 215. In some cases, a number of SPS occasions to be reported in a block feedback may be determined based on one or more factors, such as a delay sensitivity associated with the downlink communications, a number of HARQ processes associated with the block feedback, a periodicity of the SPS occasions, or any combinations thereof.

In some cases, each SPS occasion that is to be reported in a block feedback may have an associated feedback timing value, which may be referred to as a K1 value, that identifies a time between the SPS occasion and when feedback for the SPS occasion is to be reported (e.g., a number of OFDM symbols, a number of slots, etc.). In some cases, multiple K1 values may be preconfigured via RRC (e.g., in RRC signaling that provides the SPS configuration 215, or that is separate from the SPS configuration 215). In some cases, a separate activation DCI may be transmitted to activate one or more SPS configurations, and during SPS activation the K1 values for a group of SPS occasions are signaled using the activation DCI. In some case, K1 values for a group of SPS occasions may be periodically signaled to the UE 115-a. Additionally or alternatively, the base station 105-a may elect to send one DCI before the acknowledgment window associated with a block feedback report for SPS 225, which may indicate the appropriate K1 values for the various SPS occasions within the acknowledgment window. Further, in certain situations even though K1 is sent for SPS occasions, the UE 115-a may be configured to report NACKs only, as discussed herein for various feedback report configurations.

In some cases, the base station 105-a may configure minimum and maximum K1 values (e.g., via RRC) and feedback for a particular SPS occasion is transmitted using the earliest available uplink resource (e.g., physical uplink control channel (PUCCH) resource) as long as the minimum and maximum K1 values are not violated and there are enough uplink resources to transmit the feedback. In some cases, the earliest uplink resource may be an uplink resource that is configured for block feedback for a group of SPS occasions, or the earliest uplink resource may be a PUCCH resource to be used for HARQ-feedback of a dynamic physical downlink shared channel (PDSCH) communication. In some cases, the minimum and maximum K1s can be preconfigured by the base station 105-a and one set can be selected and activated using DCI as requested by the UE 115-a or initiated by the base station 105-a. In some cases, if there are no available PUCCH resources before the maximum K1, the base station 105-a may transmit a DCI to the UE 115-a that indicates the PUCCH resources that should be used for those block feedback Such block feedback techniques may allow for reduced overhead associated with physical uplink control channel (PUCCH) resources as compared to cases where feedback is provided on a per-SPS occasion basis. Additionally, per-SPS occasion feedback may lead to unnecessary interference or unnecessary radio resource waste when the base station 105-a does not transmit PDSCH at a SPS occasion (e.g., when there is no data available to be transmitted). In such an event, the UE 115-a may attempt to decode a downlink communication at the SPS occasion and generate a NACK based on not successfully decoding a transmission, which may be referred to as a "false-alarm" NACK. Such "false-alarm" NACKs may interfere other concurrent uplink transmissions (e.g., as co-channel interference to other cells, and/or as adjacent channel interference in the same cell). In some cases, a base station 105-a may handle such a false-alarm NACK when it is the only UL transmission by conducting a downlink transmission in this false-alarm ACK/NACK occasion, but providing enough gap time and gap frequency to mitigate uplink-to-downlink interference. Alternatively, the base station 105-a may decide to switch to uplink reception just for this false-alarm NACK with several OFDM symbols (including the gap for downlink-uplink switching) as overhead. Accordingly, block feedback techniques as discussed herein may mitigate the occurrence of such interference and thereby further enhance system operation (e.g., if a feedback window covers n SPS occasions, the frequency of false-alarm NACK transmission is at least suppressed to 1/n).

Such block feedback techniques also may allow for reduced uplink loading levels, as well as reduced UE 115-a power consumption. Power consumption is reduced, for example, due to longer sleeping periods of a transmit chain at the UE 115-a. With a block feedback covering n SPS occasions, the frequency that the UE 115-a turns its transmit chain on is 1/n of that with per-SPS-occasion feedback. Additionally, such block feedback techniques may be beneficial for reduced capability UEs, as discussed above.

Figure 3:
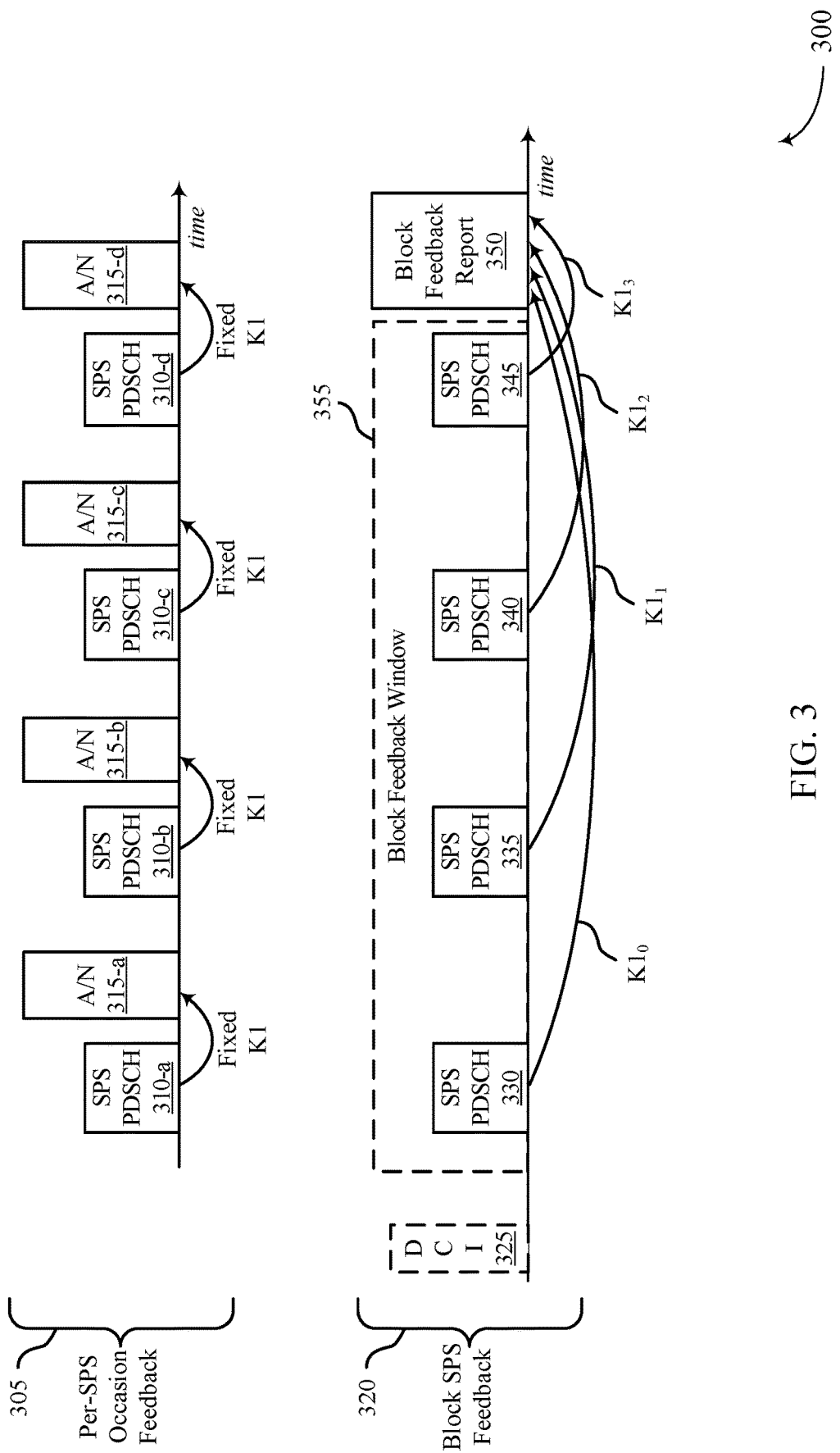
FIG. 3 illustrates an example of SPS resources and associated feedback resources that support block feedback with variable feedback timing for semi-persistent scheduling in accordance with aspects of the present disclosure.

FIG. 3 illustrates an example of SPS resources and associated feedback resources 300 that support block feedback with variable feedback timing for semi-persistent scheduling in accordance with aspects of the present disclosure. In some examples, SPS resources and associated feedback resources 300 may implement aspects of wireless communications system 100 or 200. In FIG. 3, a first example 305 illustrates per-SPS-occasion feedback, and a second example 320 illustrates block SPS feedback. In this example, a SPS configuration may be provided to a UE (e.g., a UE 115 of FIG. 1 or 2) by a base station (e.g., a base station 105 of FIG. 1 or 2).

In the first example 305 a SPS configuration may include a number of SPS PDSCH 310 occasions during which the UE is to monitor for and attempt to decode downlink communications from the base station. A number of PUCCH resources may be configured as ACK/NACK resources 315, in which each SPS PDSCH 310 occasion has a corresponding ACK/NACK resource 315 at a fixed K1 value from the SPS PDSCH 310. Such a per-SPS-occasion feedback configuration, as discussed herein, may consume additional uplink resources and UE power than block feedback techniques, such as illustrated in second example 320.

In the second example 320, the base station may configure a block feedback SPS configuration at the UE, in which a block feedback window 355 is configured that spans multiple SPS occasions. In this example, block feedback window 355 spans four SPS occasions, corresponding to a first SPS PDSCH 330 occasion, a second SPS PDSCH 335 occasion, a third SPS PDSCH 340 occasion, and a fourth SPS PDSCH 345 occasion. In other examples, the number of SPS occasions within feedback window 355 may include more or fewer SPS occasions, with four SPS occasions illustrated for purposes of discussion and illustration only. In second example 320, a block feedback report 350 may be provided in PUCCH resources configured by the block feedback SPS configuration. In this example, instead of individual ACKs/NACKs for each SPS occasion received by the UE, a group of SPS occasions received inside the block feedback window 355 are acknowledged in the single block feedback report 350 using PUCCH resource(s) at the end of the block feedback window 355. In this example, the block feedback window 355 may be defined by providing a different K1 value for each SPS occasion, in which four different K1 values (i.e., $K1_0$ through $K1_3$) each providing a feedback timing that indicates the uplink resources of the block feedback report 350.

The number of SPS occasions to be reported in the block feedback report 350 may thus be identified based on a number of different K1 values that correspond to the same uplink resource. In some cases, a base station may determine a number of SPS occasions for inclusion in the block feedback report 350. The number of SPS occasions to be included in the block feedback window 355 may be determined based on one or more of a number of different factors, such as a delay sensitivity of an application that provides data for the downlink transmissions (e.g., such that a time duration for SPS feedback may be set to be lower than the maximum latency tolerable by the application), a maximum number of HARQ processes (e.g., such that there are enough HARQ processes for receptions waiting to be acknowledged within the duration of the block feedback window 355), a SPS periodicity, or combinations thereof, for example.

In some cases, the SPS configuration may be configured by the base station using RRC Signaling. In some cases, configuration information provided by RRC signaling may include a set of K1 values for SPS occasions within the block feedback window 355, as well as SPS configuration parameters (e.g., SPS resources, SPS periodicity, PUCCH resources for transmitting block feedback, PUCCH resource periodicity, etc.). In some cases, the base station may configure number of different K1 values (e.g., 1 to N sets of K1 values), and may activate one of the sets of K1 values for block feedback. For example, an activation DCI 325 may be transmitted by the base station that indicates which set of K1 values is to be used when a SPS configuration is activated. In some cases, the K1 values can be configured along with or separately from the SPS configuration. In some cases, the block feedback may be activated or deactivated for each of a number of particular configured SPS configurations or groups of SPS configurations. Activation, reconfiguration or deactivation may be via MAC (e.g., in a MAC-CE), in physical layer signaling (e.g., in DCI), or combinations thereof.

The SPS configuration may also provide PUCCH resources for the block feedback report 350. In such cases, the PUCCH resources may be include sufficient resources for feedback information for each of the SPS occasions. In some cases, a PUCCH format may be determined for the block feedback report 350. In some examples, the PUCCH format may be based on a number of SPS occasions that are to be acknowledged in the block feedback report 350. In some cases, different PUCCH formats may be configured, which may have transmission parameters that are suited for different amounts of data and may span different numbers of OFDM symbols. For example, in some NR deployments, PUCCH formats 0 through 4 may be configured, in which PUCCH formats 0 and 1 may be used for up to two bits of feedback, and formats 2 through 4 may be used for two or more bits of feedback. In some cases, the PUCCH format may be selected based on the number of SPS occasions that are to be acknowledged, where if the block feedback window 355 includes one or two SPS occasions, PUCCH format 0 or 1 may be used, and if the block feedback window 355 includes three or more SPS occasions, PUCCH format 2, 3, or 4 may be used. In other cases, PUCCH formats 0/1 may be used for immediate transmission of NACKs (as discussed with reference to FIG. 6), and PUCCH format 2/3/4 may be for block feedback reports 350.

Figure 4:
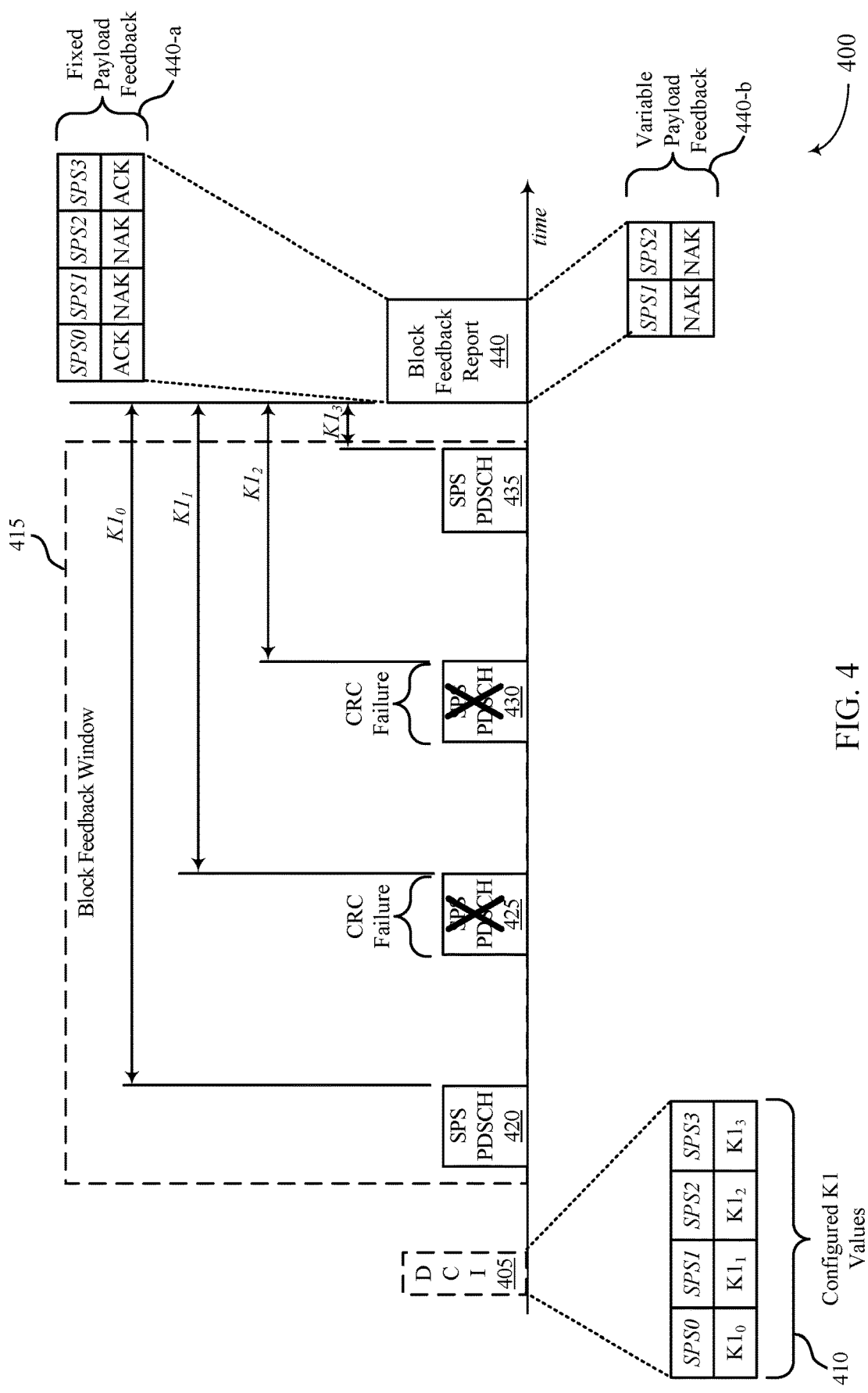
FIG. 4 illustrates another example of SPS resources and associated feedback resources that support block feedback with variable feedback timing for semi-persistent scheduling in accordance with aspects of the present disclosure.

FIG. 4 illustrates another example of SPS resources and associated feedback resources 400 that support block feedback with variable feedback timing for semi-persistent scheduling in accordance with aspects of the present disclosure. In some examples, SPS resources and associated feedback resources 400 may implement aspects of wireless communications system 100 or 200. In this example, a SPS configuration may be provided to a UE (e.g., a UE 115 of FIG. 1 or 2) by a base station (e.g., a base station 105 of FIG. 1 or 2) in which block feedback may be configured. In this example, each SPS occasion within a block feedback window 415 may be provided with a separate K1 value.

In this example, an activation DCI 405 may be transmitted from the base station to the UE to activate a SPS configuration and initiate SPS downlink transmissions. In this example, the activation DCI 405 may include an indication to use a set of configured K1 values 410, where each SPS occasion to be reported in the block feedback report 440 has a different K1 value (i.e., $K1_0$ through $K1_3$ in this example) that indicates the same PUCCH resource that is used for the block feedback report 440. In some cases, a number of different sets of K1 values may be configured via RRC, and the activation DCI 405 may indicate the set of configured K1 values 410 from the number of different sets of K1 values (e.g., based on an index value associated with the different sets of K1 values). In other cases, the activation DCI 405 may provide an indication of the configured K1 values 410 directly.

The SPS occasions may include a first SPS PDSCH 420, a second SPS PDSCH 425, a third SPS PDSCH 430, and a fourth SPS PDSCH 435, which have K1 values of $K1_0$ through $K1_3$, respectively, according to the configured K1 values 410. In this example, a block feedback report 440 may provide feedback indications for each of the SPS occasions in the block feedback window 415. In some cases a fixed payload block feedback report 440-*a* may include a number of ACK/NACK indications that corresponds to the number of SPS occasions configured for block feedback. In the example of FIG. 4, the first SPS PDSCH 420 and the fourth SPS PDSCH 435 may be successfully decoded at the UE, and thus an ACK may be indicated at the corresponding ACK/NACK indications, and the second SPS PDSCH 425 and third SPS PDSCH 430 may have a CRC failure that indicates unsuccessful decoding, and thus a NACK may be indicated at the corresponding ACK/NACK indications. In other cases, a variable payload block feedback report 440-*b* may include only NACK indications from the UE. Thus, in this example, such a variable payload block feedback report 440-*b* may indicate the NACK feedback for the second SPS PDSCH 425 and third SPS PDSCH 430. Such variable payload feedback reports 440-*b* may thus have different payload sizes, and the base station may perform blind decoding at the PUCCH resources for the different potential payload sizes of the variable payload feedback report 440-*b*.

Figure 5:
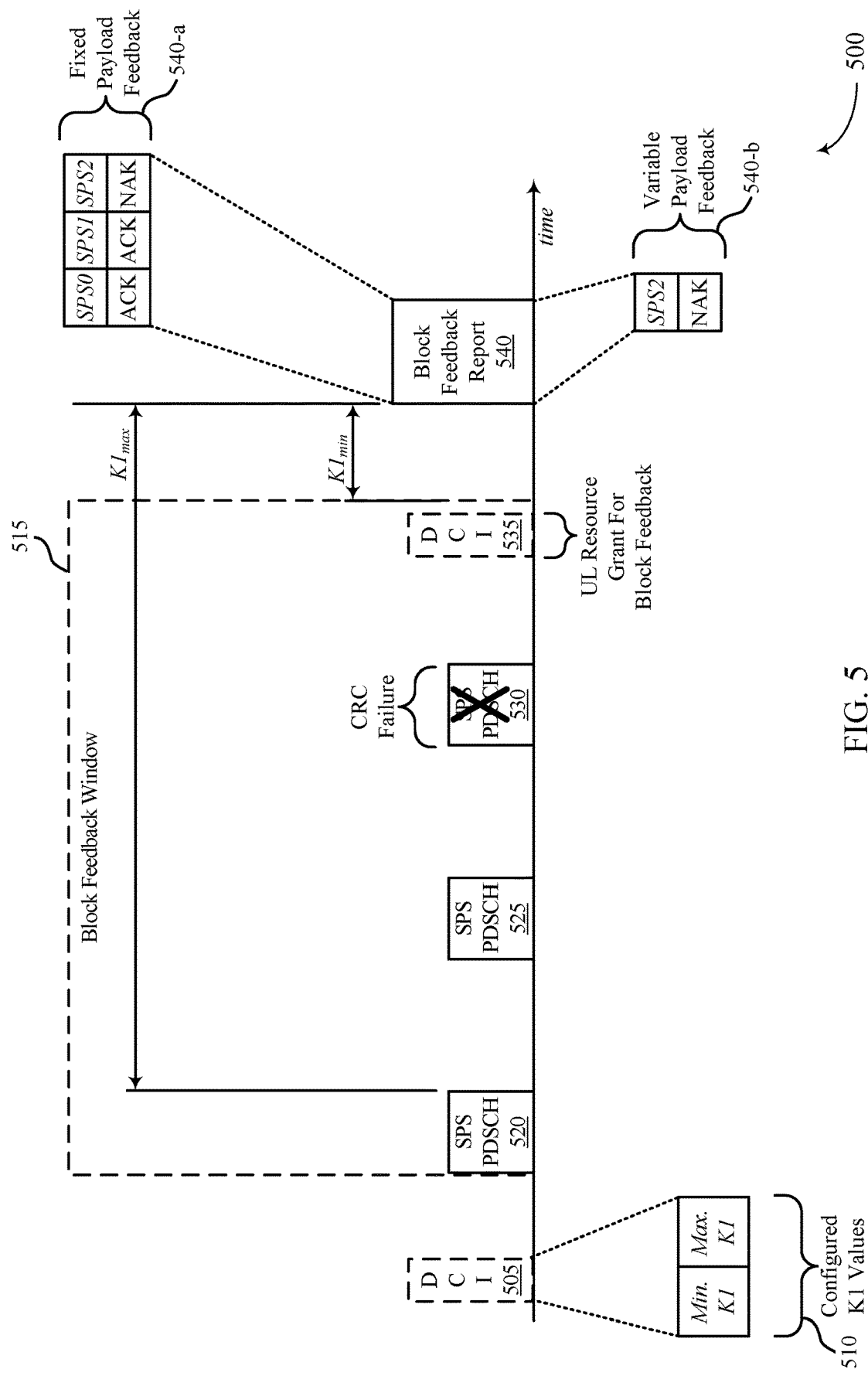
FIG. 5 illustrates another example of SPS resources and associated feedback resources that support block feedback with variable feedback timing for semi-persistent scheduling in accordance with aspects of the present disclosure.

FIG. 5 illustrates another example of SPS resources and associated feedback resources 500 that support block feedback with variable feedback timing for semi-persistent scheduling in accordance with aspects of the present disclosure. In some examples, SPS resources and associated feedback resources 500 may implement aspects of wireless communications system 100 or 200. In this example, a SPS configuration may be provided to a UE (e.g., a UE 115 of FIG. 1 or 2) by a base station (e.g., a base station 105 of FIG. 1 or 2) in which block feedback may be configured. In this example, a block feedback window 515 may be determined based on configured K1 values 510 that provide a minimum K1 value and a maximum K1 value.

In this example, an activation DCI 505 may be transmitted from the base station to the UE to activate a SPS configuration and initiate SPS downlink transmissions. In this example, the activation DCI 505 may include an indication to use a set of configured K1 values 510, which include the minimum and maximum K1 values, where each SPS occasion within the minimum and maximum K1 values in advance of PUCCH resources used to for block feedback report 540 are to be reported in the block feedback report 540. In some cases, a number of different sets of minimum and maximum K1 values may be configured via RRC, and the activation DCI 505 may indicate the set of configured K1 values 510 from the number of different pairs of minimum and maximum K1 values (e.g., based on an index value associated with the different sets of K1 values). In other cases, the activation DCI 505 may provide an indication of the configured K1 values 510 directly.

The SPS occasions in this example may include a first SPS PDSCH 520, a second SPS PDSCH 525, and a third SPS PDSCH 530, are within the minimum and maximum K1 values. In this example, a block feedback report 540 may provide feedback indications for each of the SPS occasions in the block feedback window 515. In some cases a fixed payload block feedback report 540-*a* may include a number of ACK/NACK indications that corresponds to the number of SPS occasions of the block feedback. In the example of FIG. 5, the first SPS PDSCH 520 and the second SPS PDSCH 525 may be successfully decoded at the UE, and thus an ACK may be indicated at the corresponding ACK/NACK indications, and the third SPS PDSCH 530 may have a CRC failure that indicates unsuccessful decoding, and thus a NACK may be indicated at the corresponding ACK/NACK indication. In other cases, a variable payload block feedback report 540-*b* may include only NACK indications from the UE. Thus, in this example, such a variable payload block feedback report 540-*b* may indicate only the NACK feedback for the third SPS PDSCH 530. Such variable payload feedback reports 540-*b* may thus have different payload sizes, and the base station may perform blind decoding at the PUCCH resources for the different potential payload sizes of the variable payload feedback report 540-*b*. In some cases, of one or more SPS occasions do not lie within the minimum and maximum K1 values relative to a set of configured PUCCH resources associated with the SPS configuration, the base station may transmit a separate DCI 535 that may indicate a resource grant for block feedback.

Figure 6:
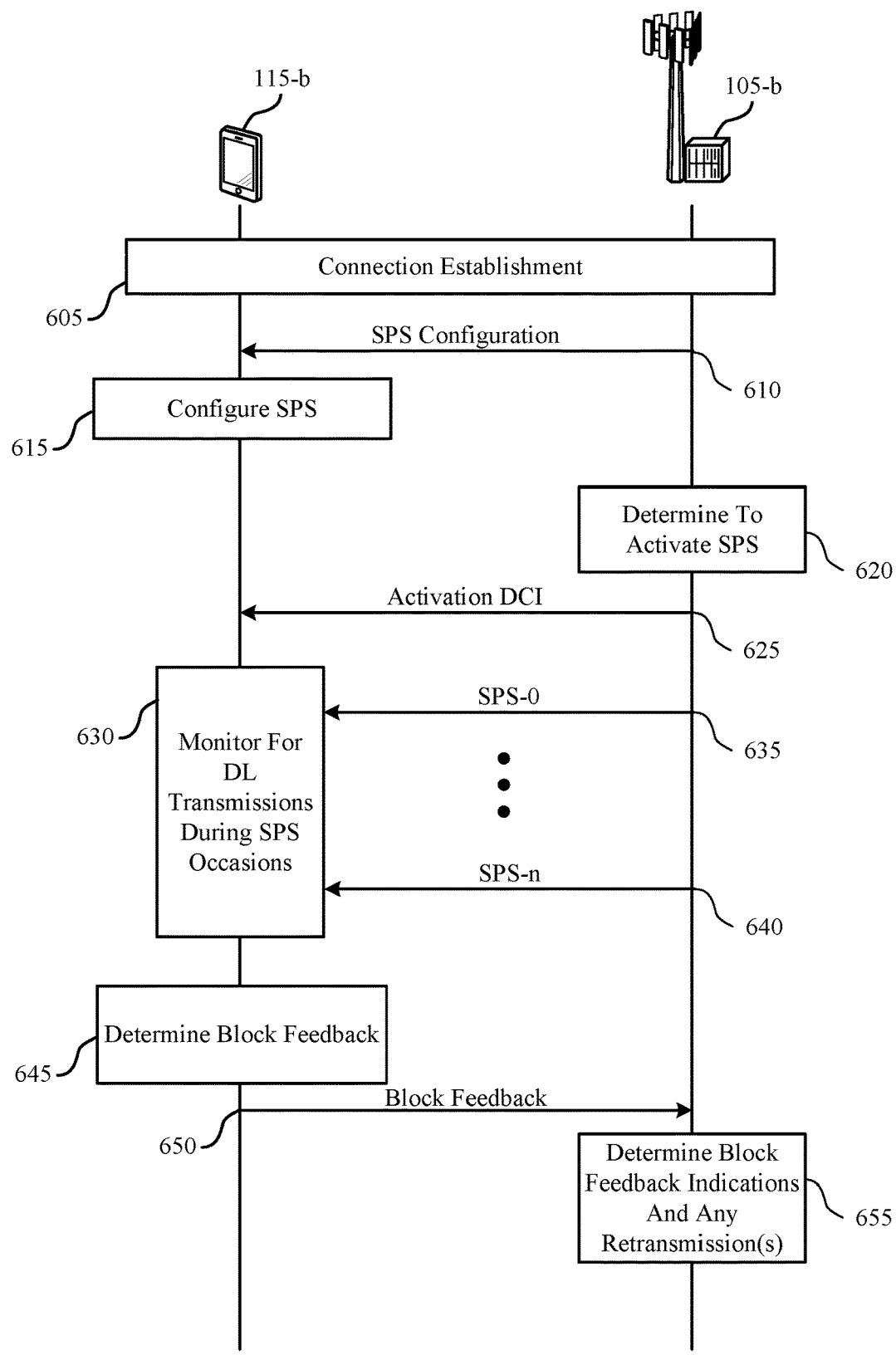
FIG. 6 illustrates an example of a process flow that supports block feedback with variable feedback timing for semi-persistent scheduling in accordance with aspects of the present disclosure.

FIG. 6 illustrates an example of a process flow 600 that supports block feedback with variable feedback timing for semi-persistent scheduling in accordance with aspects of the present disclosure. In some examples, process flow 600 may implement aspects of wireless communications system 100 or 200. Process flow 600 may be implemented by a UE 115-*b* and a base station 105-*b* as described herein. In the following description of the process flow 600, the communications between the UE 115-*b* and the base station 105-*b* may be transmitted in a different order than the example order shown, or the operations performed by the UE 115-*b* and base station 105-*b* may be performed in different orders or at different times. Some operations may also be omitted from the process flow 600, and other operations may be added to the process flow 600.

In some examples, the operations illustrated in process flow 600 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 605, the base station 105-b and UE 115-b may perform a connection establishment procedure. The connection establishment procedure may be a RRC connection establishment according to established RRC connection procedures.

At 610, the base station 105-b may transmit an SPS configuration to the UE 115-b. The SPS configuration may configure various aspects of SPS communications, such as a periodicity and resources for downlink communications from the base station 105-b and the UE 115-b a periodicity and resource for uplink communications from the UE 115-b to the base station 105-b, various transmission parameters (e.g., a modulation and coding scheme), and the like. In some cases, the SPS configuration may provide a block feedback configuration that enables block feedback for multiple SPS occasions in a single block feedback communication. In some cases, the SPS configuration may include configuration information for a number of different block feedback configurations (e.g., multiple different sets of two or more feedback timing values), and one of the configurations may be selected when the SPS is activated for communications.

At 615, the UE 115-b may configure the SPS, in accordance with the SPS configuration. In some cases, multiple different SPS configurations for multiple different types communications or data channels may be configured, and block feedback may include feedback for SPS occasions of two or more different activated SPS configurations. At 620, the base station 105-b may determine to activate the SPS configuration. Based on the determination to activate the SPS configuration, at 625, the base station 105-b may transmit activation DCI to the UE. In some cases, the activation DCI may indicate that the SPS configuration is activated, and one or more configured parameters (e.g., a set of K1 parameters from multiple configured available sets of K1 parameters) that are selected for the SPS communications.

At 630, the UE 115-b may monitor for downlink SPS transmissions in accordance with the activated SPS configuration. In some cases, such monitoring may include attempting to decode communications on configured SPS resources, and determining based on the decoding whether transmissions in the SPS occasion are successfully received (e.g., based on a CRC passing for the decoded communications). If the decoding is successful, the UE 115-b may determine that associated feedback is an acknowledgment, and if decoding is unsuccessful the associated feedback is a negative acknowledgment. At 635 through 640, the base station 105-b may transmit SPS communications in accordance with the activated SPS configuration, which the UE 115-b may attempt to decode.

At 645, the UE 115-b may determine a block feedback report. The block feedback report may include feedback indications for multiple SPS downlink communications, based on multiple different K1 values that are associated with the block feedback report, as discussed herein. At 650, the UE 115-b may transmit the block feedback report to the base station 105-b. At 655, the base station 105-b may determine block feedback indications of the UE 115-b based on the block feedback report, and determine if any retransmission are to be initiated based on the feedback indications.

Figure 7:
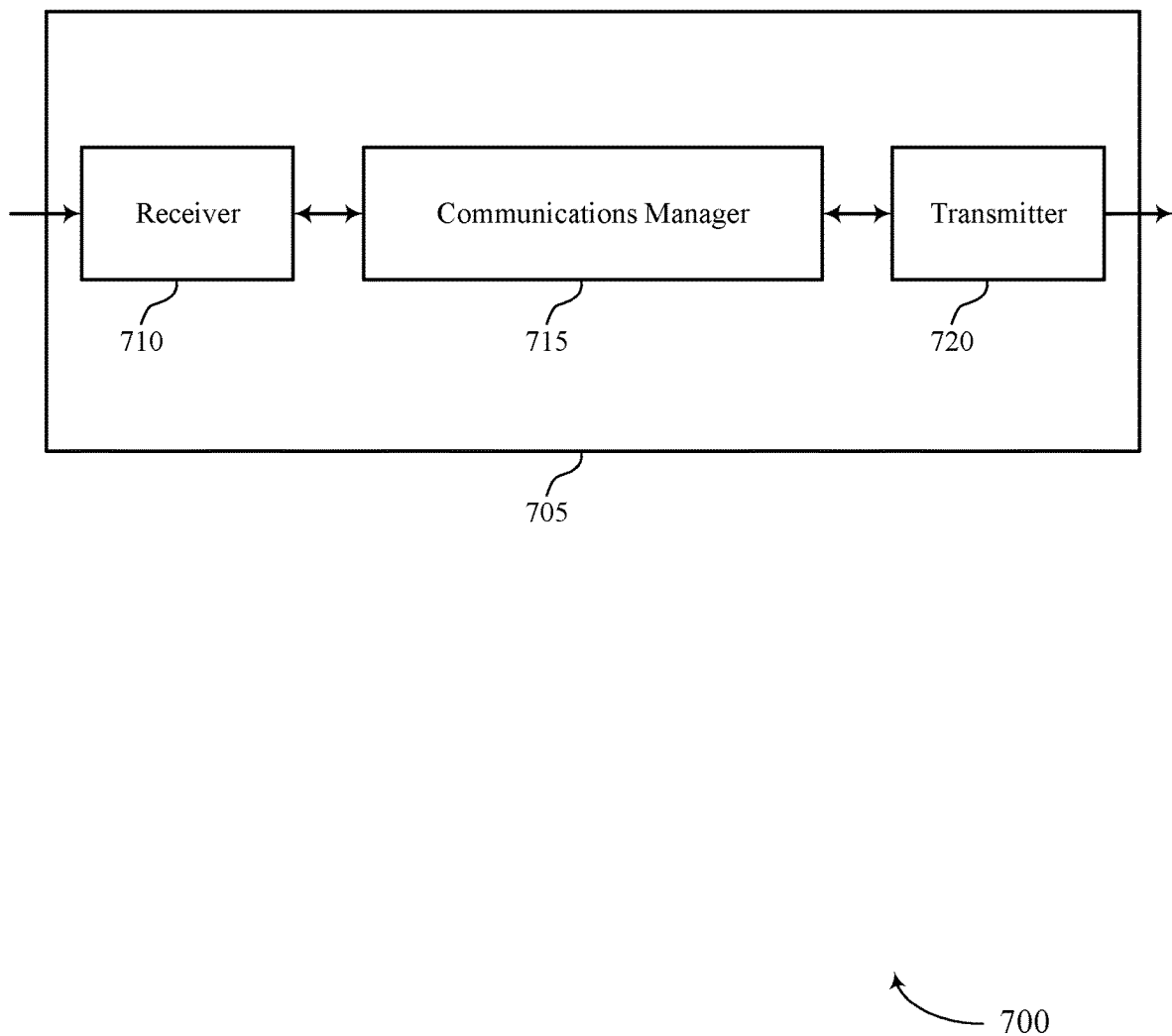
FIGS. 7 and 8 show block diagrams of devices that support block feedback with variable feedback timing for semi-persistent scheduling in accordance with aspects of the present disclosure.

FIG. 7 shows a block diagram 700 of a device 705 that supports block feedback with variable feedback timing for semi-persistent scheduling in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to block feedback with variable feedback timing for semi-persistent scheduling, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, a semi-persistent scheduling configuration for a set of semi-persistent scheduling occasions that are scheduled for downlink communications from the base station to the UE, identify two or more feedback timings for transmission of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station, transmit a block feedback in the uplink resource that indicates the feedback for each of the one or more semi-persistent scheduling occasions, and determine feedback for each of the one or more semi-persistent scheduling occasions. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
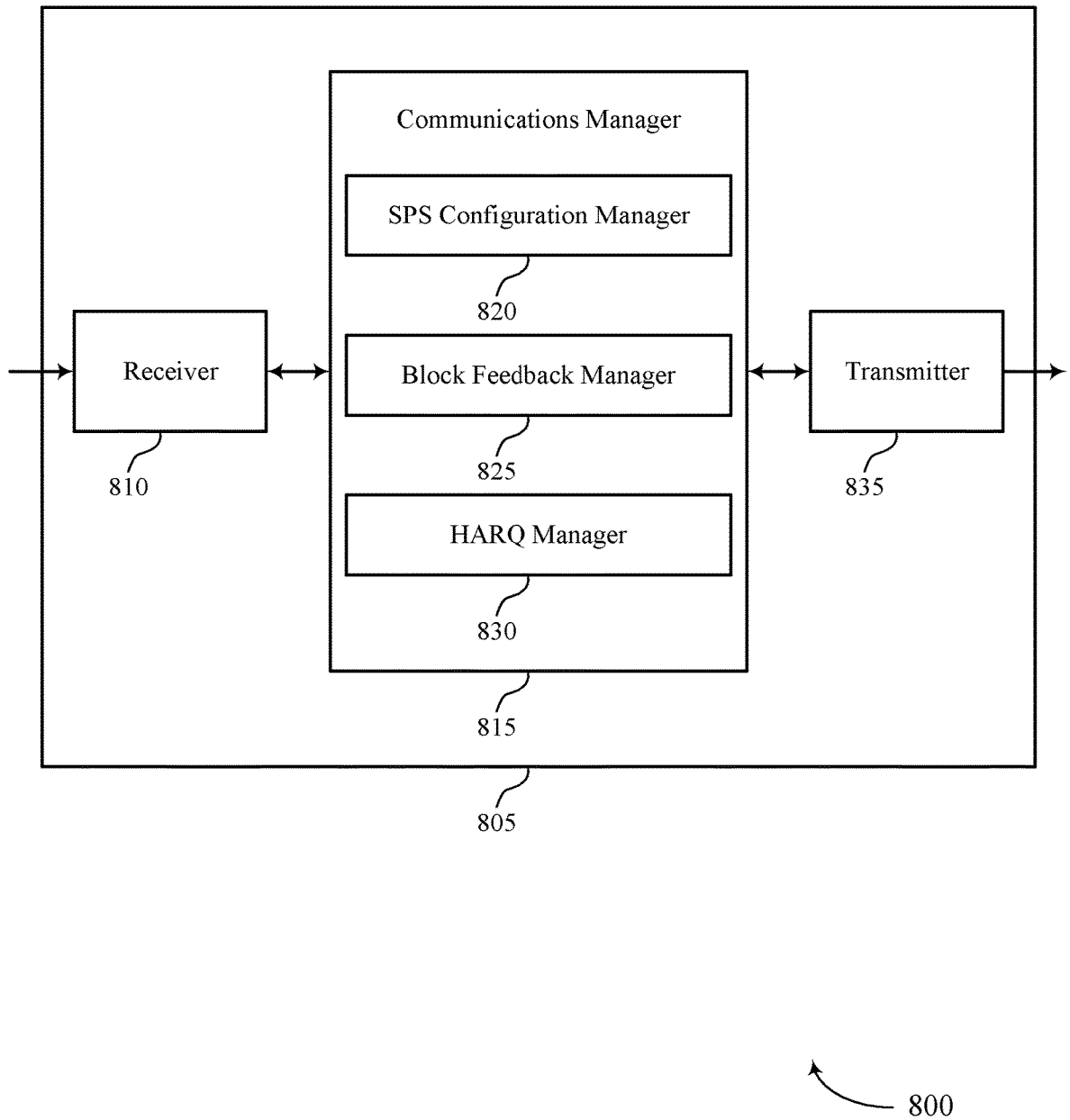

FIG. 8 shows a block diagram 800 of a device 805 that supports block feedback with variable feedback timing for semi-persistent scheduling in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to block feedback with variable feedback timing for semi-persistent scheduling, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a SPS configuration manager 820, a block feedback manager 825, and a HARQ manager 830. The communications manager 815 may be an example of aspects of the communications manager 1010 described herein.

The SPS configuration manager 820 may receive, from a base station, a semi-persistent scheduling configuration for a set of semi-persistent scheduling occasions that are scheduled for downlink communications from the base station to the UE.

The block feedback manager 825 may identify two or more feedback timings for transmission of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station and transmit a block feedback in the uplink resource that indicates the feedback for each of the one or more semi-persistent scheduling occasions.

The HARQ manager 830 may determine feedback for each of the one or more semi-persistent scheduling occasions.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
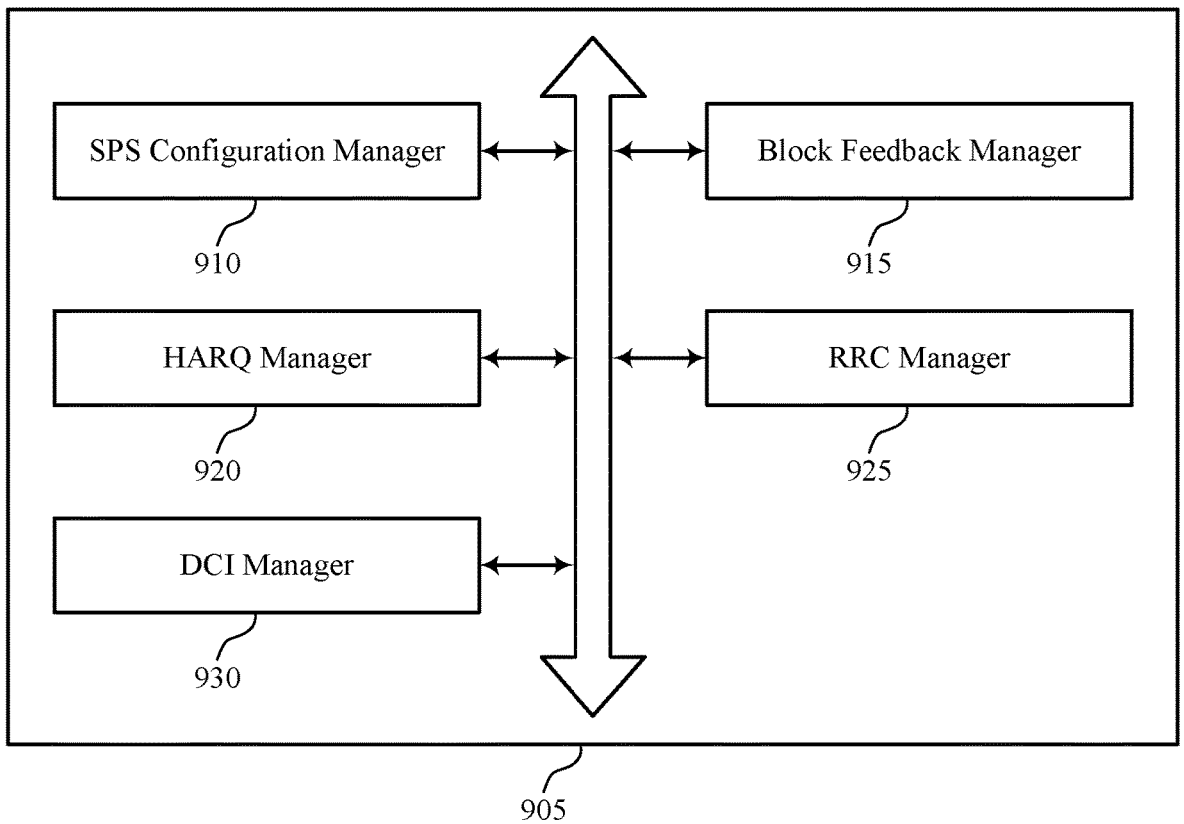
FIG. 9 shows a block diagram of a communications manager that supports block feedback with variable feedback timing for semi-persistent scheduling in accordance with aspects of the present disclosure.

FIG. 9 shows a block diagram 900 of a communications manager 905 that supports block feedback with variable feedback timing for semi-persistent scheduling in accordance with aspects of the present disclosure. The communications manager 905 may be an example of aspects of a communications manager 715, a communications manager 815, or a communications manager 1010 described herein. The communications manager 905 may include a SPS configuration manager 910, a block feedback manager 915, a HARQ manager 920, a RRC manager 925, and a DCI manager 930. Each of these modules may communicate, directly or indirectly, with one another (e.g., via one or more buses).

The SPS configuration manager 910 may receive, from a base station, a semi-persistent scheduling configuration for a set of semi-persistent scheduling occasions that are scheduled for downlink communications from the base station to the UE. In some cases, a set of minimum feedback timing values and maximum feedback timing values are configured at the UE and a downlink control information communication from the base station activates one of the set of minimum feedback timing values and maximum feedback timing values. In some cases, the block feedback is activated, reconfigured, or deactivated based on an indication provided in a medium access control (MAC) control element or in physical layer signaling from the base station.

The block feedback manager 915 may identify two or more feedback timings for transmission of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station. In some examples, the block feedback manager 915 may transmit a block feedback in the uplink resource that indicates the feedback for each of the one or more semi-persistent scheduling occasions. In some examples, the block feedback manager 915 may receive a separate feedback timing for each semi-persistent scheduling occasion within a feedback window associated with the uplink resource. In some examples, the block feedback manager 915 may receive, from the base station, periodic updates to the feedback timings for two or more semi-persistent scheduling occasions within the feedback window.

In some examples, the block feedback manager 915 may identify a minimum feedback timing value and a maximum feedback timing value from the two or more feedback timings, and where semi-persistent scheduling occasions within the minimum and the maximum feedback timing values are reported in an earliest uplink resource that is available for block feedback. In some cases, the block feedback indicates feedback only for semi-persistent scheduling occasions that have negative-acknowledgment feedback. In some cases, the minimum feedback timing value and the maximum feedback timing value are received in radio resource control signaling, and where the block feedback is transmitted for semi-persistent scheduling occasions within the minimum feedback timing value and the maximum feedback timing value of the earliest uplink resource.

In some cases, the earliest uplink resource is a configured block feedback resource for a group of semi-persistent scheduling occasions or uplink resources associated with a different feedback communication of a dynamically configured uplink resource. In some cases, the block feedback has a fixed payload size based on a number of semi-persistent scheduling occasions with feedback reported in the block feedback. In some cases, the block feedback has a variable payload size based on a number of negative acknowledgments to be reported in the block feedback.

The HARQ manager 920 may determine feedback for each of the one or more semi-persistent scheduling occasions. The RRC Manager 925 may provide configuration for SPS communications, block feedback configurations, or combinations thereof. In some cases, a set of different feedback timings are configured in RRC signaling.

The DCI manager 930 may receive an activation DCI communication from the base station that activates the semi-persistent scheduling configuration and indicates which of the set of different feedback timings are to be used for each semi-persistent scheduling occasion within a feedback window that includes the two or more semi-persistent scheduling occasions. In some examples, the DCI manager 930 may receive a DCI communication from the base station that indicates the uplink resource and that indicates the two or more feedback timings for two or more semi-persistent scheduling occasions that are to be reported in the uplink resource. In some examples, the DCI manager 930 may receive, from the base station, a downlink control information communication that provides an uplink grant associated with the uplink resource when a set of configured uplink resources are unavailable before the maximum feedback timing value of an earliest semi-persistent scheduling occasion that has unreported feedback.

Figure 10:
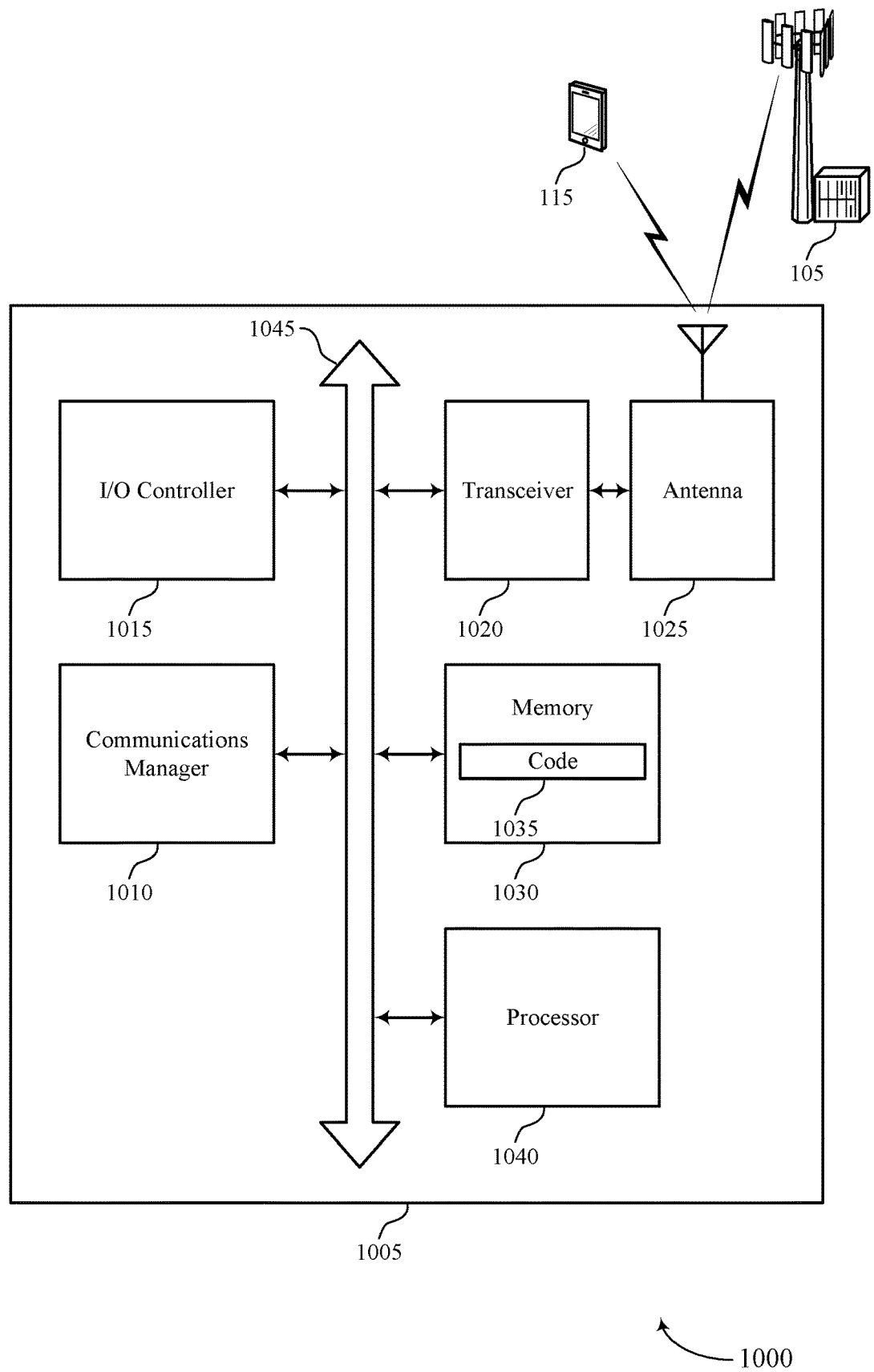
FIG. 10 shows a diagram of a system including a device that supports block feedback with variable feedback timing for semi-persistent scheduling in accordance with aspects of the present disclosure.

FIG. 10 shows a diagram of a system 1000 including a device 1005 that supports block feedback with variable feedback timing for semi-persistent scheduling in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, a semi-persistent scheduling configuration for a set of semi-persistent scheduling occasions that are scheduled for downlink communications from the base station to the UE, identify two or more feedback timings for transmission of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station, transmit a block feedback in the uplink resource that indicates the feedback for each of the one or more semi-persistent scheduling occasions, and determine feedback for each of the one or more semi-persistent scheduling occasions.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting block feedback with variable feedback timing for semi-persistent scheduling).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
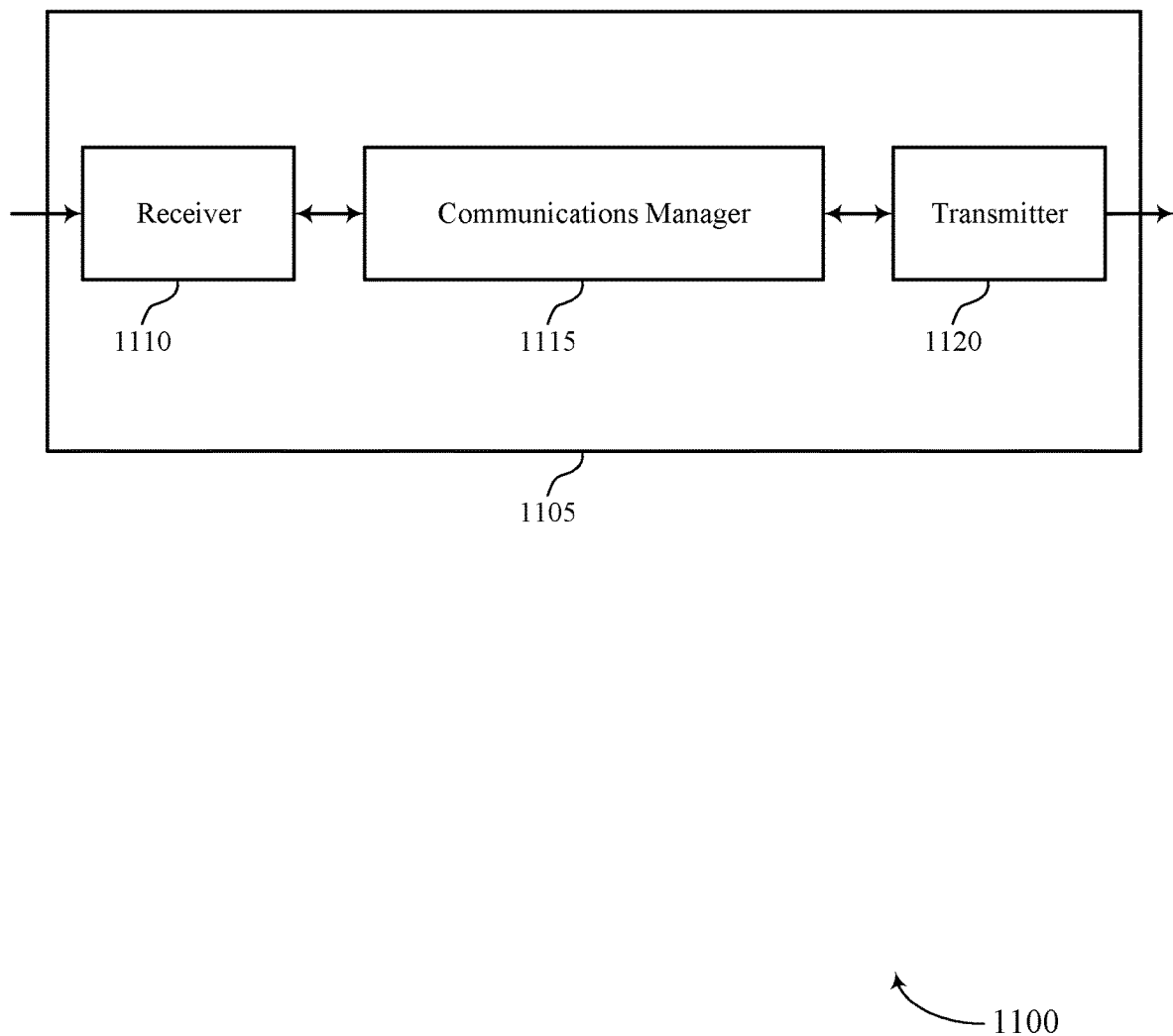
FIGS. 11 and 12 show block diagrams of devices that support block feedback with variable feedback timing for semi-persistent scheduling in accordance with aspects of the present disclosure.

FIG. 11 shows a block diagram 1100 of a device 1105 that supports block feedback with variable feedback timing for semi-persistent scheduling in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to block feedback with variable feedback timing for semi-persistent scheduling, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE, a semi-persistent scheduling configuration for a set of semi-persistent scheduling occasions that are scheduled for downlink communications from the base station to the UE, identify two or more feedback timings for reception of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station, and receive, from the UE, a block feedback in the uplink resource that indicates feedback for each of the two or more semi-persistent scheduling occasions. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
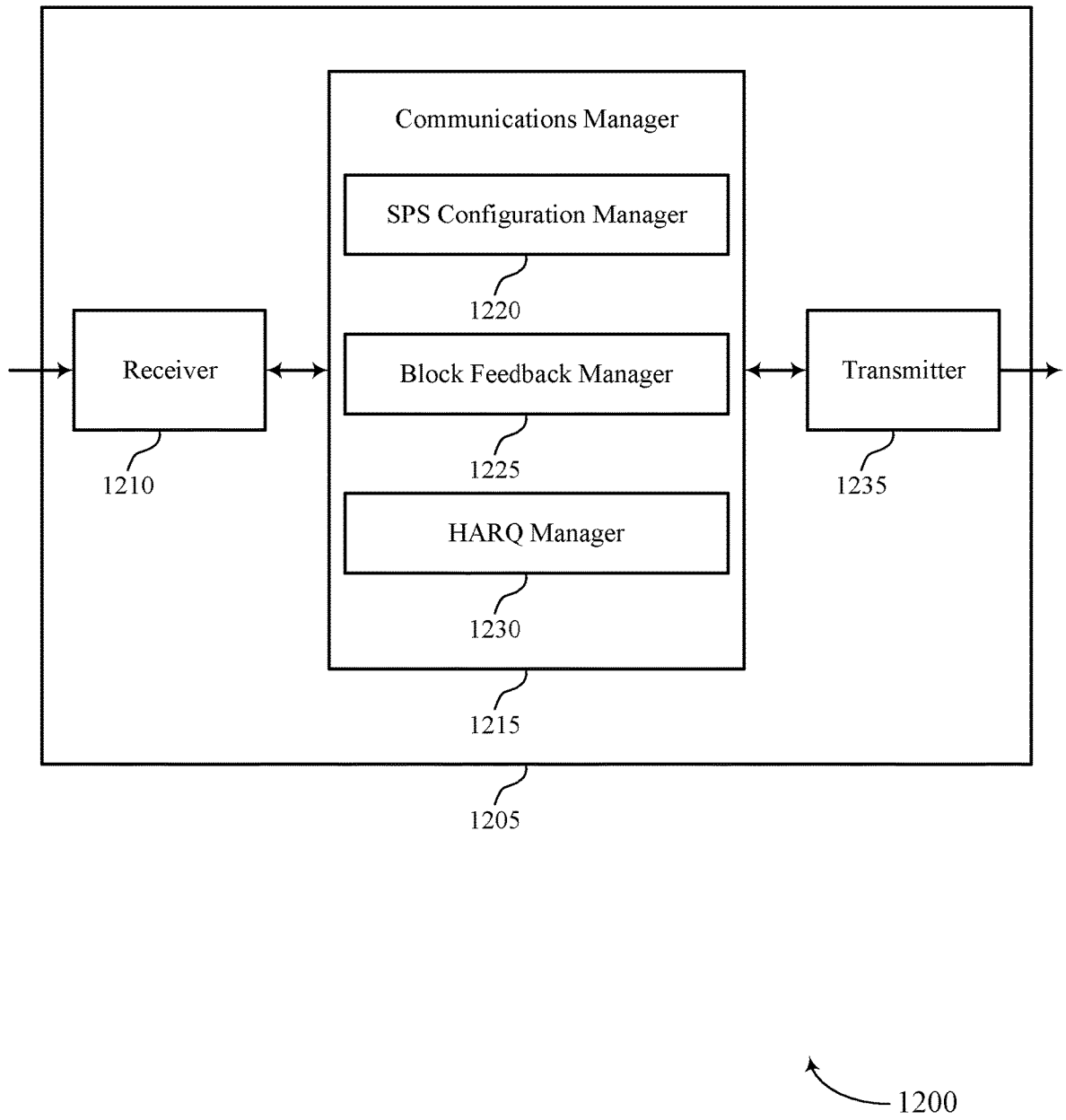

FIG. 12 shows a block diagram 1200 of a device 1205 that supports block feedback with variable feedback timing for semi-persistent scheduling in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to block feedback with variable feedback timing for semi-persistent scheduling, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a SPS configuration manager 1220, a block feedback manager 1225, and a HARQ manager 1230. The communications manager 1215 may be an example of aspects of the communications manager 1410 described herein.

The SPS configuration manager 1220 may transmit, to a UE, a semi-persistent scheduling configuration for a set of semi-persistent scheduling occasions that are scheduled for downlink communications from the base station to the UE.

The block feedback manager 1225 may identify two or more feedback timings for reception of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station.

The HARQ manager 1230 may receive, from the UE, a block feedback in the uplink resource that indicates feedback for each of the two or more semi-persistent scheduling occasions.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
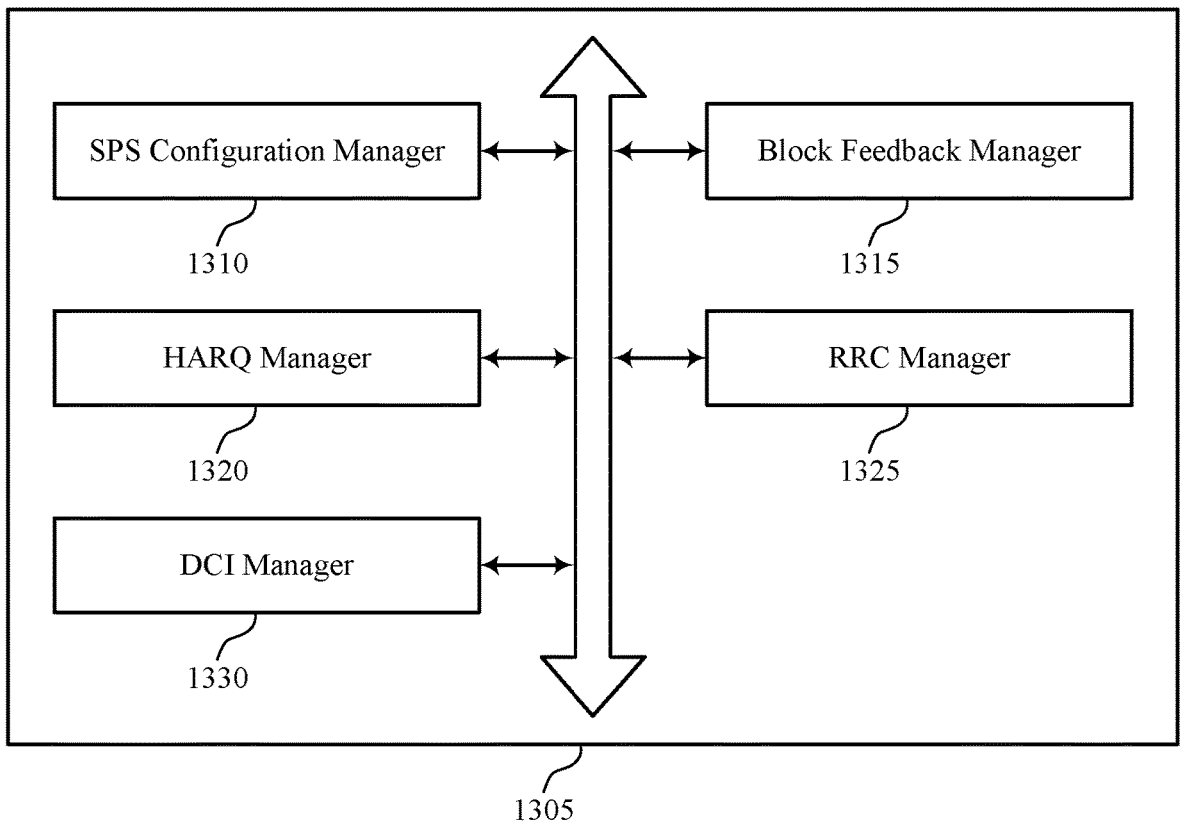
FIG. 13 shows a block diagram of a communications manager that supports block feedback with variable feedback timing for semi-persistent scheduling in accordance with aspects of the present disclosure.

FIG. 13 shows a block diagram 1300 of a communications manager 1305 that supports block feedback with variable feedback timing for semi-persistent scheduling in accordance with aspects of the present disclosure. The communications manager 1305 may be an example of aspects of a communications manager 1115, a communications manager 1215, or a communications manager 1410 described herein. The communications manager 1305 may include a SPS configuration manager 1310, a block feedback manager 1315, a HARQ manager 1320, a RRC manager 1325, and a DCI manager 1330. Each of these modules may communicate, directly or indirectly, with one another (e.g., via one or more buses).

The SPS configuration manager 1310 may transmit, to a UE, a semi-persistent scheduling configuration for a set of semi-persistent scheduling occasions that are scheduled for downlink communications from the base station to the UE. In some cases, the block feedback is activated, reconfigured, or deactivated based on an indication provided in a medium access control (MAC) control element or in physical layer signaling from the base station.

The block feedback manager 1315 may identify two or more feedback timings for reception of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station. In some examples, the block feedback manager 1315 may provide a separate feedback timing for each semi-persistent scheduling occasion within a feedback window associated with the uplink resource. In some examples, the block feedback manager 1315 may transmit, to the UE, periodic updates to the feedback timings for two or more semi-persistent scheduling occasions within the feedback window.

In some examples, the block feedback manager 1315 may provide a minimum feedback timing value and a maximum feedback timing value, and where semi-persistent scheduling occasions within the minimum and the maximum feedback timing values are reported in an earliest uplink resource that is available for block feedback. In some cases, the block feedback indicates feedback only for semi-persistent scheduling occasions that have negative-acknowledgment feedback. In some cases, the minimum feedback timing value and the maximum feedback timing value are configured in radio resource control signaling, and where the block feedback is transmitted for semi-persistent scheduling occasions within the minimum feedback timing value and the maximum feedback timing value of the earliest uplink resource. In some cases, the earliest uplink resource is a configured block feedback resource for a group of semi-persistent scheduling occasions or uplink resources associated with a different feedback communication of a dynamically configured uplink resource. In some cases, a set of minimum feedback timing values and maximum feedback timing values are configured at the UE and a downlink control information communication to the UE activates one of the set of minimum feedback timing values and maximum feedback timing values.

In some cases, the block feedback has a fixed payload size based on a number of semi-persistent scheduling occasions with feedback reported in the block feedback. In some cases, the block feedback has a variable payload size based on a number of negative acknowledgments to be reported in the block feedback.

The HARQ manager 1320 may receive, from the UE, a block feedback in the uplink resource that indicates feedback for each of the two or more semi-persistent scheduling occasions. The RRC Manager 1325 may configure UEs with one or more SPS configurations, block feedback configurations, or combinations thereof. In some cases, a set of different feedback timings are configured in RRC signaling.

The DCI manager 1330 may transmit an activation DCI communication to the UE that activates the semi-persistent scheduling configuration and indicates which of the set of different feedback timings are to be used for each semi-persistent scheduling occasion within a feedback window that includes two or more semi-persistent scheduling occasions. In some examples, the DCI manager 1330 may transmit a DCI communication to the UE that indicates the uplink resource and that indicates the two or more feedback timings for two or more semi-persistent scheduling occasions that are to be reported in the uplink resource. In some examples, the DCI manager 1330 may transmit, to the UE, a downlink control information communication that provides an uplink grant associated with the uplink resource when a set of configured uplink resources are unavailable before the maximum feedback timing value of an earliest semi-persistent scheduling occasion that has unreported feedback.

Figure 14:
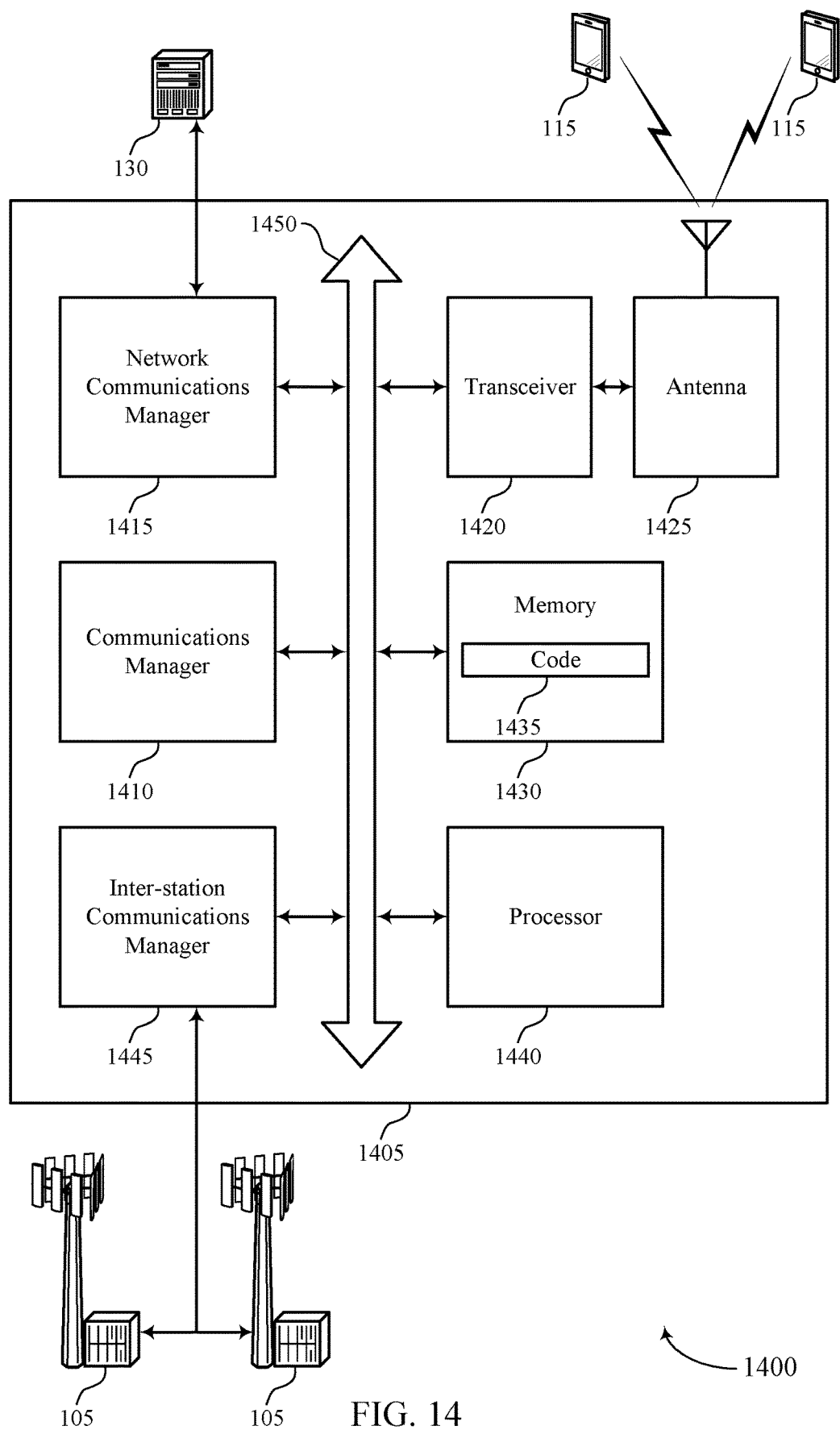
FIG. 14 shows a diagram of a system including a device that supports block feedback with variable feedback timing for semi-persistent scheduling in accordance with aspects of the present disclosure.

FIG. 14 shows a diagram of a system 1400 including a device 1405 that supports block feedback with variable feedback timing for semi-persistent scheduling in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE, a semi-persistent scheduling configuration for a set of semi-persistent scheduling occasions that are scheduled for downlink communications from the base station to the UE, identify two or more feedback timings for reception of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station, and receive, from the UE, a block feedback in the uplink resource that indicates feedback for each of the two or more semi-persistent scheduling occasions.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting block feedback with variable feedback timing for semi-persistent scheduling).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
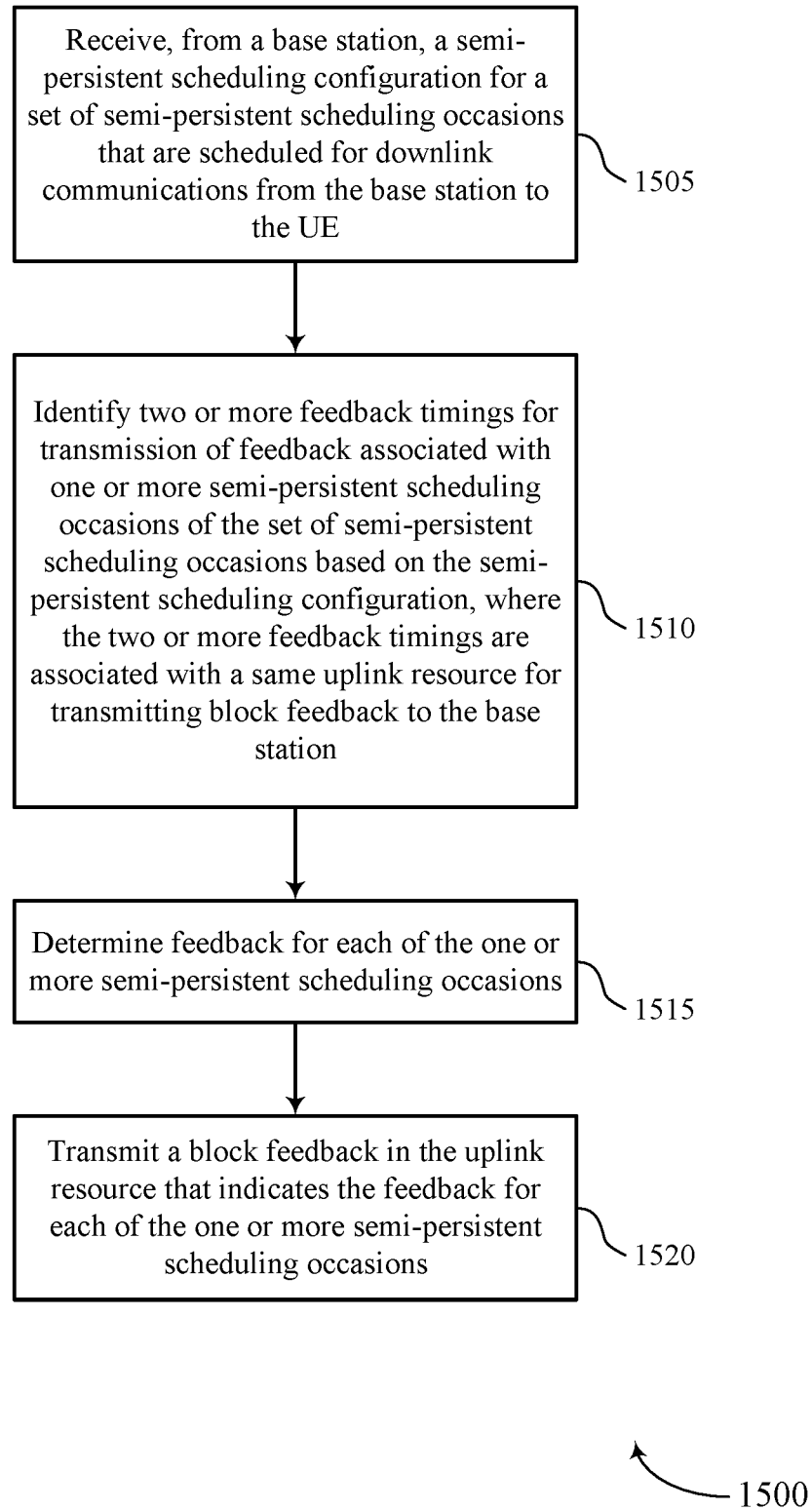
FIGS. 15 through 21 show flowcharts illustrating methods that support block feedback with variable feedback timing for semi-persistent scheduling in accordance with aspects of the present disclosure.

FIG. 15 shows a flowchart illustrating a method 1500 that supports block feedback with variable feedback timing for semi-persistent scheduling in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a semi-persistent scheduling configuration for a set of semi-persistent scheduling occasions that are scheduled for downlink communications from the base station to the UE. The operations of 1505 may be performed according to the methods described herein. In some examples, aspects of the operations of 1505 may be performed by a SPS configuration manager as described with reference to FIGS. 7 through 10.

At 1510, the UE may identify two or more feedback timings for transmission of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station. The operations of 1510 may be performed according to the methods described herein. In some examples, aspects of the operations of 1510 may be performed by a block feedback manager as described with reference to FIGS. 7 through 10.

At 1515, the UE may determine feedback for each of the one or more semi-persistent scheduling occasions. The operations of 1515 may be performed according to the methods described herein. In some examples, aspects of the operations of 1515 may be performed by a HARQ manager as described with reference to FIGS. 7 through 10.

At 1520, the UE may transmit a block feedback in the uplink resource that indicates the feedback for each of the one or more semi-persistent scheduling occasions. The operations of 1520 may be performed according to the methods described herein. In some examples, aspects of the operations of 1520 may be performed by a block feedback manager as described with reference to FIGS. 7 through 10.

Figure 16:
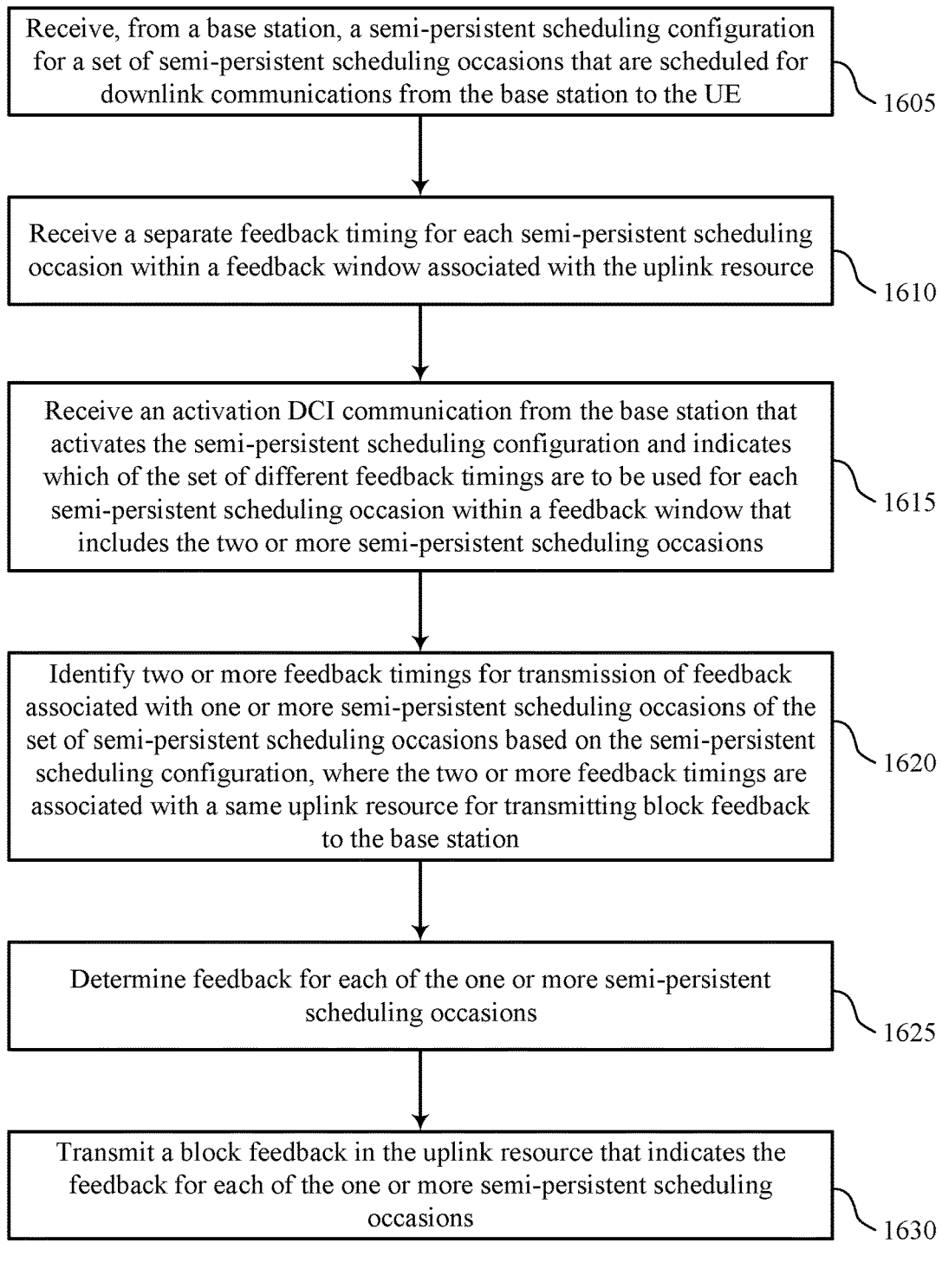

FIG. 16 shows a flowchart illustrating a method 1600 that supports block feedback with variable feedback timing for semi-persistent scheduling in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a semi-persistent scheduling configuration for a set of semi-persistent scheduling occasions that are scheduled for downlink communications from the base station to the UE. The operations of 1605 may be performed according to the methods described herein. In some examples, aspects of the operations of 1605 may be performed by a SPS configuration manager as described with reference to FIGS. 7 through 10.

At 1610, the UE may receive a separate feedback timing for each semi-persistent scheduling occasion within a feedback window associated with the uplink resource. The operations of 1610 may be performed according to the methods described herein. In some examples, aspects of the operations of 1610 may be performed by a block feedback manager as described with reference to FIGS. 7 through 10. In some cases, a set of different feedback timings are configured in RRC signaling. In some cases, the set of different feedback timings are provided with the semi-persistent scheduling configuration. In other cases, the set of different feedback timings are provided separately from the semi-persistent scheduling configuration (e.g., in separate RRC signaling or in a separate DCI).

At 1615, the UE may receive an activation DCI communication from the base station that activates the semi-persistent scheduling configuration and indicates which of the set of different feedback timings are to be used for each semi-persistent scheduling occasion within a feedback window that includes the two or more semi-persistent scheduling occasions. The operations of 1615 may be performed according to the methods described herein. In some examples, aspects of the operations of 1615 may be performed by a DCI manager as described with reference to FIGS. 7 through 10.

At 1620, the UE may identify two or more feedback timings for transmission of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station. The operations of 1620 may be performed according to the methods described herein. In some examples, aspects of the operations of 1620 may be performed by a block feedback manager as described with reference to FIGS. 7 through 10.

At 1625, the UE may determine feedback for each of the one or more semi-persistent scheduling occasions. The operations of 1625 may be performed according to the methods described herein. In some examples, aspects of the operations of 1625 may be performed by a HARQ manager as described with reference to FIGS. 7 through 10.

At 1630, the UE may transmit a block feedback in the uplink resource that indicates the feedback for each of the one or more semi-persistent scheduling occasions. The operations of 1630 may be performed according to the methods described herein. In some examples, aspects of the operations of 1630 may be performed by a block feedback manager as described with reference to FIGS. 7 through 10.

Figure 17:
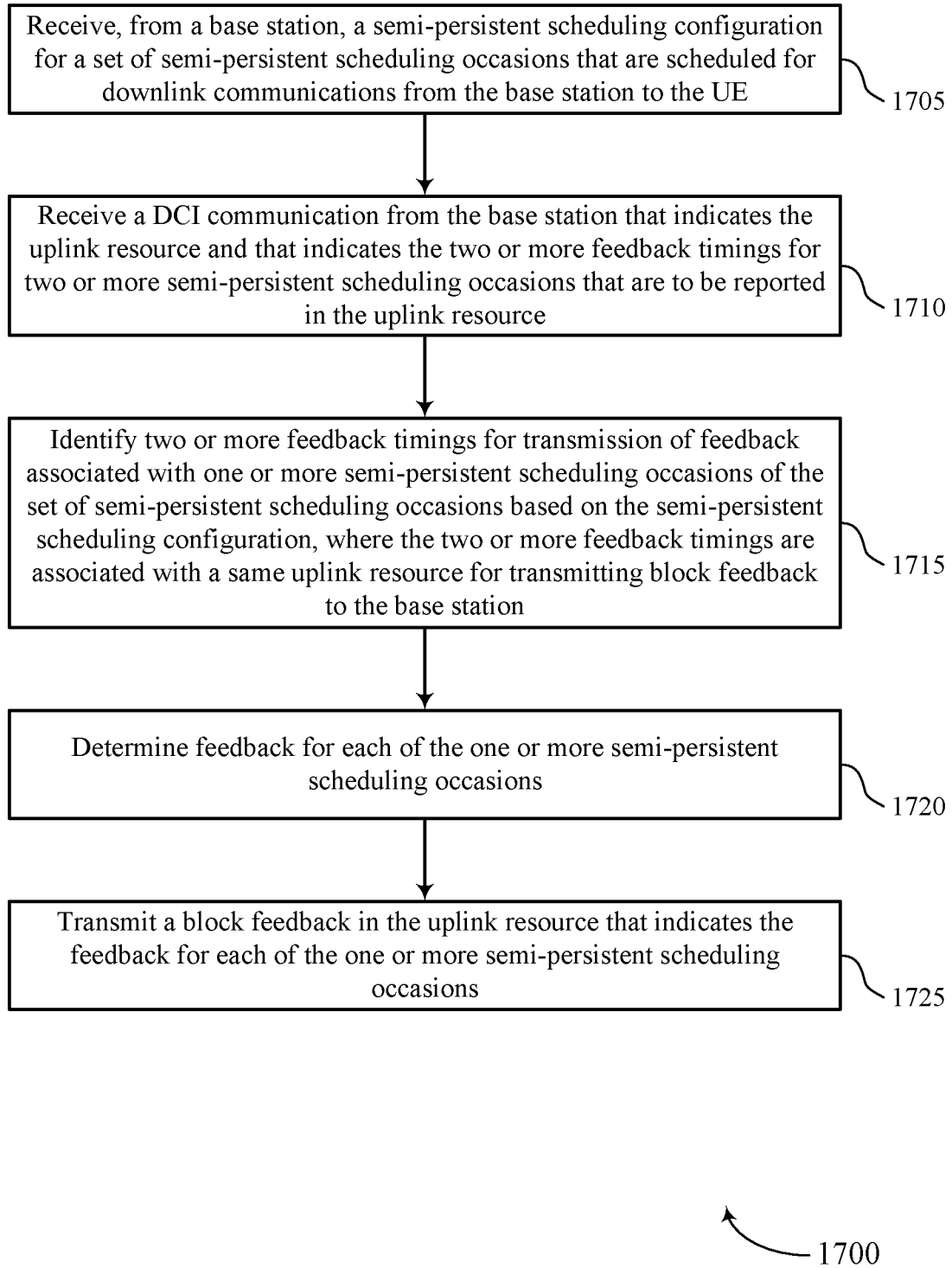

FIG. 17 shows a flowchart illustrating a method 1700 that supports block feedback with variable feedback timing for semi-persistent scheduling in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a semi-persistent scheduling configuration for a set of semi-persistent scheduling occasions that are scheduled for downlink communications from the base station to the UE. The operations of 1705 may be performed according to the methods described herein. In some examples, aspects of the operations of 1705 may be performed by a SPS configuration manager as described with reference to FIGS. 7 through 10.

At 1710, the UE may receive a DCI communication from the base station that indicates the uplink resource and that indicates the two or more feedback timings for two or more semi-persistent scheduling occasions that are to be reported in the uplink resource. The operations of 1710 may be performed according to the methods described herein. In some examples, aspects of the operations of 1710 may be performed by a DCI manager as described with reference to FIGS. 7 through 10.

At 1715, the UE may identify two or more feedback timings for transmission of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station. The operations of 1715 may be performed according to the methods described herein. In some examples, aspects of the operations of 1715 may be performed by a block feedback manager as described with reference to FIGS. 7 through 10.

At 1720, the UE may determine feedback for each of the one or more semi-persistent scheduling occasions. The operations of 1720 may be performed according to the methods described herein. In some examples, aspects of the operations of 1720 may be performed by a HARQ manager as described with reference to FIGS. 7 through 10.

At 1725, the UE may transmit a block feedback in the uplink resource that indicates the feedback for each of the one or more semi-persistent scheduling occasions. The operations of 1725 may be performed according to the methods described herein. In some examples, aspects of the operations of 1725 may be performed by a block feedback manager as described with reference to FIGS. 7 through 10.

Figure 18:
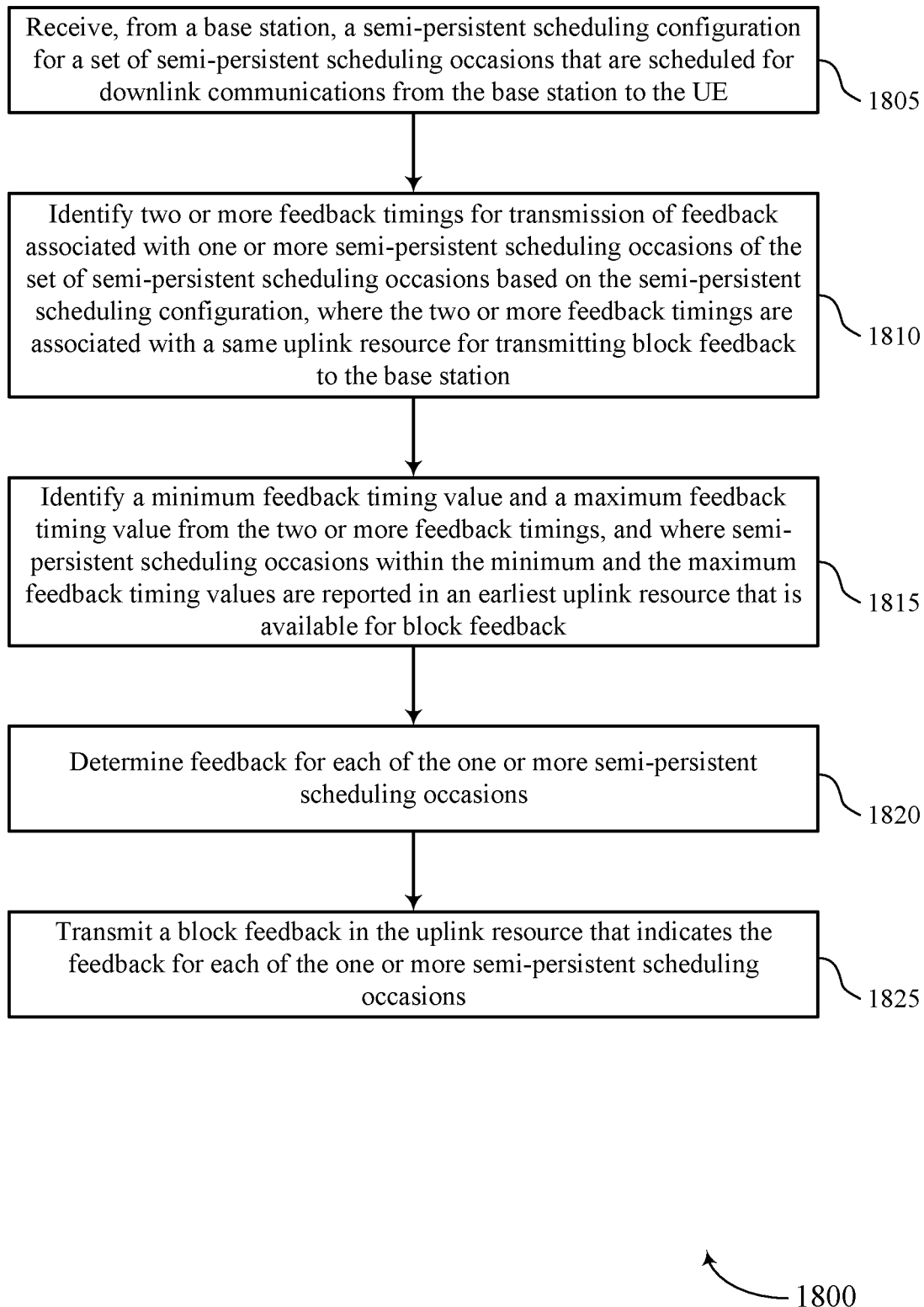

FIG. 18 shows a flowchart illustrating a method 1800 that supports block feedback with variable feedback timing for semi-persistent scheduling in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a semi-persistent scheduling configuration for a set of semi-persistent scheduling occasions that are scheduled for downlink communications from the base station to the UE. The operations of 1805 may be performed according to the methods described herein. In some examples, aspects of the operations of 1805 may be performed by a SPS configuration manager as described with reference to FIGS. 7 through 10.

At 1810, the UE may identify two or more feedback timings for transmission of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station. The operations of 1810 may be performed according to the methods described herein. In some examples, aspects of the operations of 1810 may be performed by a block feedback manager as described with reference to FIGS. 7 through 10.

At 1815, the UE may identify a minimum feedback timing value and a maximum feedback timing value from the two or more feedback timings, and where semi-persistent scheduling occasions within the minimum and the maximum feedback timing values are reported in an earliest uplink resource that is available for block feedback. The operations of 1815 may be performed according to the methods described herein. In some examples, aspects of the operations of 1815 may be performed by a block feedback manager as described with reference to FIGS. 7 through 10. In some cases, the minimum feedback timing value and the maximum feedback timing value are received in radio resource control signaling, and where the block feedback is transmitted for semi-persistent scheduling occasions within the minimum feedback timing value and the maximum feedback timing value of the earliest uplink resource.

At 1820, the UE may determine feedback for each of the one or more semi-persistent scheduling occasions. The operations of 1820 may be performed according to the methods described herein. In some examples, aspects of the operations of 1820 may be performed by a HARQ manager as described with reference to FIGS. 7 through 10.

At 1825, the UE may transmit a block feedback in the uplink resource that indicates the feedback for each of the one or more semi-persistent scheduling occasions. The operations of 1825 may be performed according to the methods described herein. In some examples, aspects of the operations of 1825 may be performed by a block feedback manager as described with reference to FIGS. 7 through 10.

Figure 19:
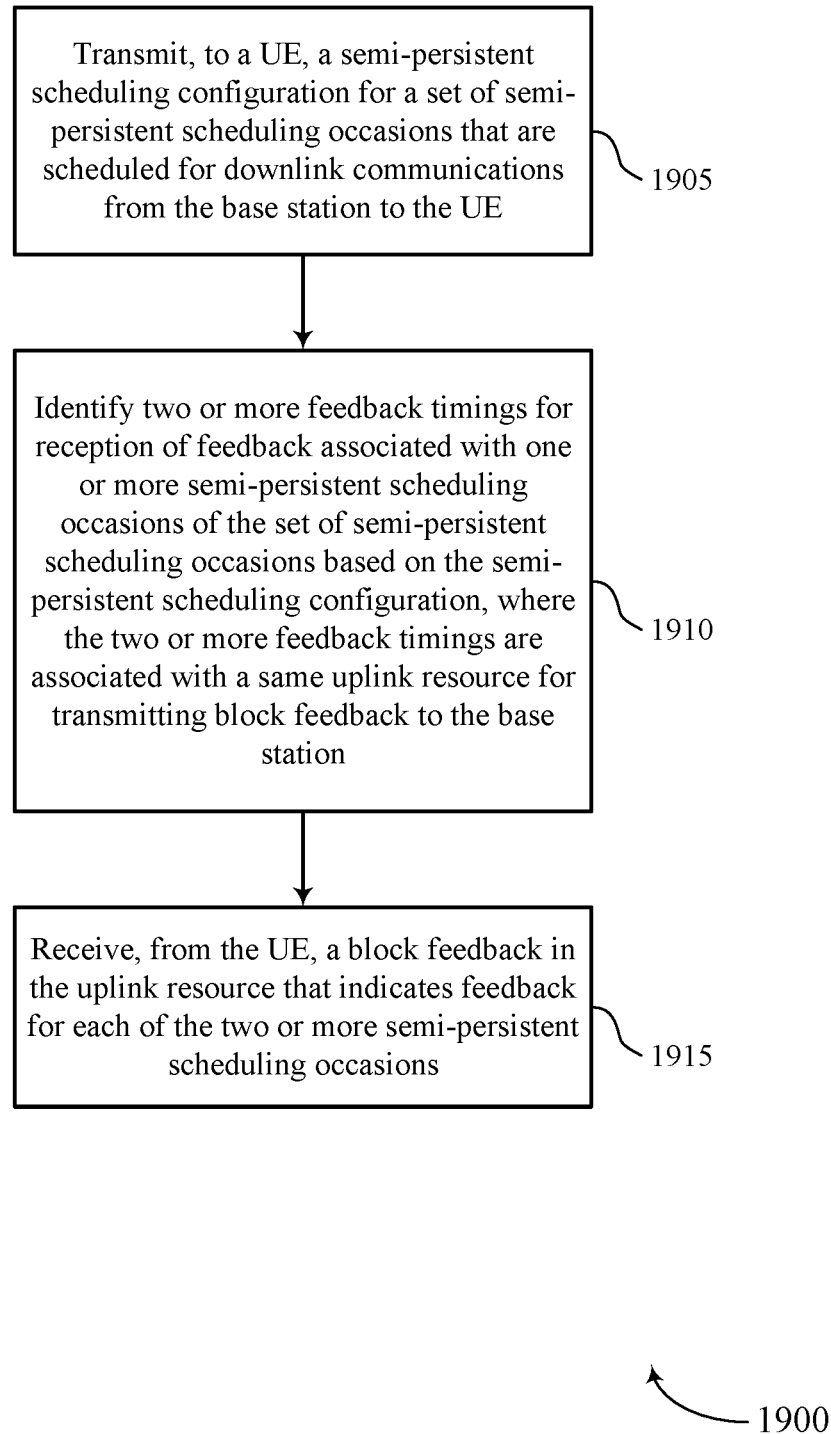

FIG. 19 shows a flowchart illustrating a method 1900 that supports block feedback with variable feedback timing for semi-persistent scheduling in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, a semi-persistent scheduling configuration for a set of semi-persistent scheduling occasions that are scheduled for downlink communications from the base station to the UE. The operations of 1905 may be performed according to the methods described herein. In some examples, aspects of the operations of 1905 may be performed by a SPS configuration manager as described with reference to FIGS. 11 through 14.

At 1910, the base station may identify two or more feedback timings for reception of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station. The operations of 1910 may be performed according to the methods described herein. In some examples, aspects of the operations of 1910 may be performed by a block feedback manager as described with reference to FIGS. 11 through 14.

At 1915, the base station may receive, from the UE, a block feedback in the uplink resource that indicates feedback for each of the two or more semi-persistent scheduling occasions. The operations of 1915 may be performed according to the methods described herein. In some examples, aspects of the operations of 1915 may be performed by a HARQ manager as described with reference to FIGS. 11 through 14.

Figure 20:
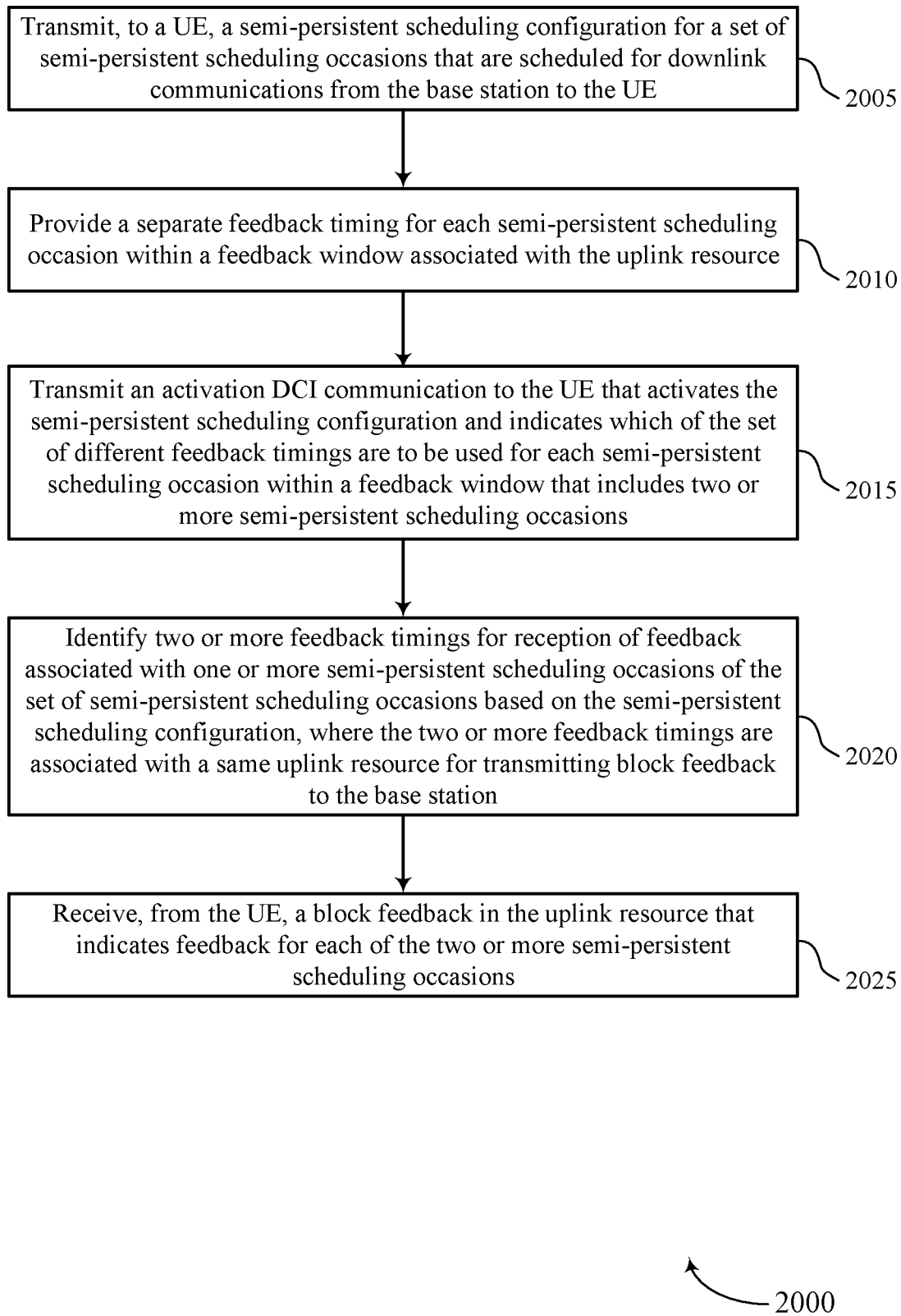

FIG. 20 shows a flowchart illustrating a method 2000 that supports block feedback with variable feedback timing for semi-persistent scheduling in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, a semi-persistent scheduling configuration for a set of semi-persistent scheduling occasions that are scheduled for downlink communications from the base station to the UE. The operations of 2005 may be performed according to the methods described herein. In some examples, aspects of the operations of 2005 may be performed by a SPS configuration manager as described with reference to FIGS. 11 through 14.

At 2010, the base station may provide a separate feedback timing for each semi-persistent scheduling occasion within a feedback window associated with the uplink resource. The operations of 2010 may be performed according to the methods described herein. In some examples, aspects of the operations of 2010 may be performed by a block feedback manager as described with reference to FIGS. 11 through 14. In some cases, a set of different feedback timings are configured in RRC signaling. In some cases, the set of different feedback timings are provided with the semi-persistent scheduling configuration. In other cases, the set of different feedback timings are provided separately from the semi-persistent scheduling configuration.

At 2015, the base station may transmit an activation DCI communication to the UE that activates the semi-persistent scheduling configuration and indicates which of the set of different feedback timings are to be used for each semi-persistent scheduling occasion within a feedback window that includes two or more semi-persistent scheduling occasions. The operations of 2015 may be performed according to the methods described herein. In some examples, aspects of the operations of 2015 may be performed by a DCI manager as described with reference to FIGS. 11 through 14.

At 2020, the base station may identify two or more feedback timings for reception of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station. The operations of 2020 may be performed according to the methods described herein. In some examples, aspects of the operations of 2020 may be performed by a block feedback manager as described with reference to FIGS. 11 through 14.

At 2025, the base station may receive, from the UE, a block feedback in the uplink resource that indicates feedback for each of the two or more semi-persistent scheduling occasions. The operations of 2025 may be performed according to the methods described herein. In some examples, aspects of the operations of 2025 may be performed by a HARQ manager as described with reference to FIGS. 11 through 14.

Figure 21:
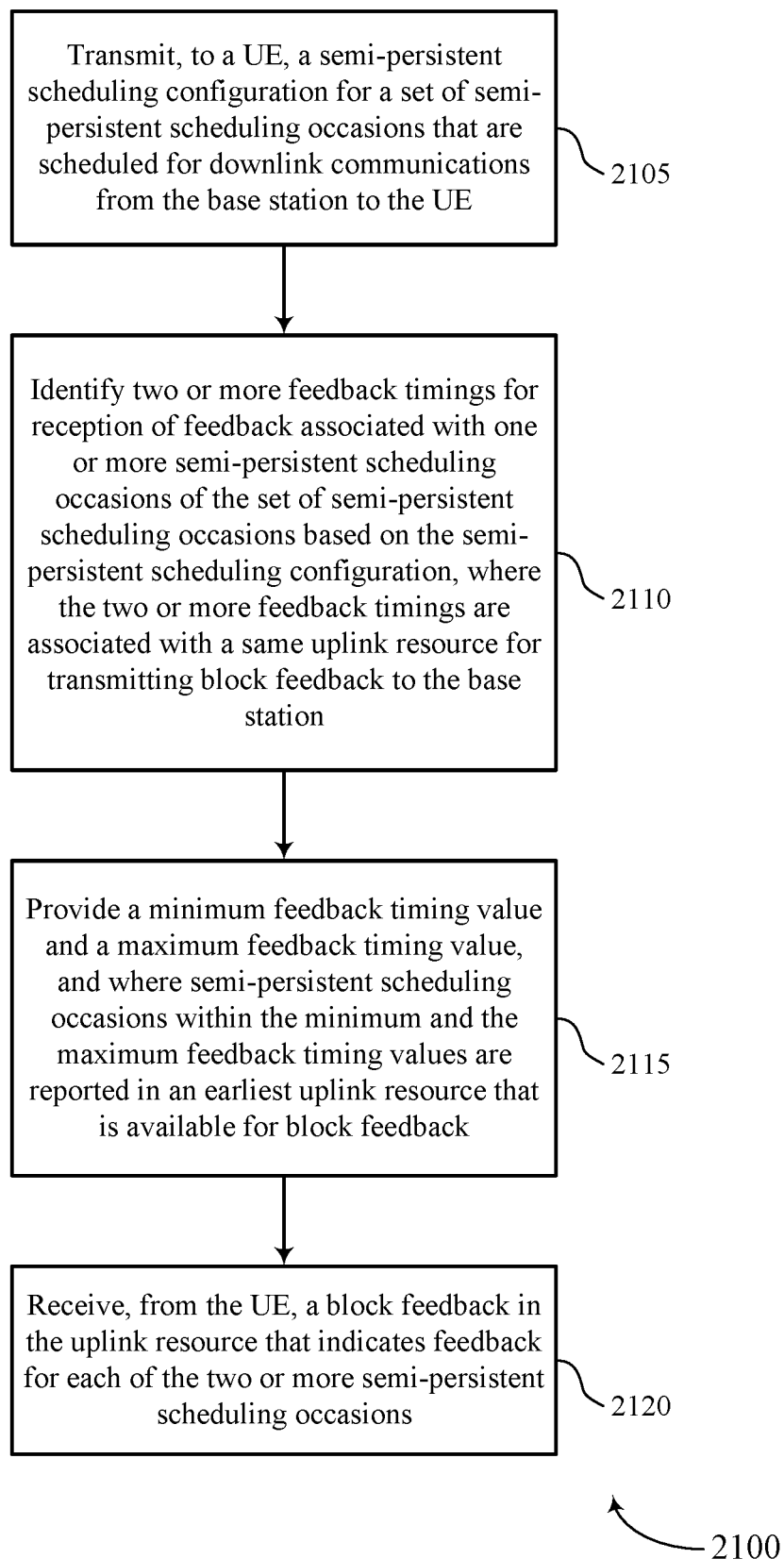

FIG. 21 shows a flowchart illustrating a method 2100 that supports block feedback with variable feedback timing for semi-persistent scheduling in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, a semi-persistent scheduling configuration for a set of semi-persistent scheduling occasions that are scheduled for downlink communications from the base station to the UE. The operations of 2105 may be performed according to the methods described herein. In some examples, aspects of the operations of 2105 may be performed by a SPS configuration manager as described with reference to FIGS. 11 through 14.

At 2110, the base station may identify two or more feedback timings for reception of feedback associated with one or more semi-persistent scheduling occasions of the set of semi-persistent scheduling occasions based on the semi-persistent scheduling configuration, where the two or more feedback timings are associated with a same uplink resource for transmitting block feedback to the base station. The operations of 2110 may be performed according to the methods described herein. In some examples, aspects of the operations of 2110 may be performed by a block feedback manager as described with reference to FIGS. 11 through 14.

At 2115, the base station may provide a minimum feedback timing value and a maximum feedback timing value, and where semi-persistent scheduling occasions within the minimum and the maximum feedback timing values are reported in an earliest uplink resource that is available for block feedback. The operations of 2115 may be performed according to the methods described herein. In some examples, aspects of the operations of 2115 may be performed by a block feedback manager as described with reference to FIGS. 11 through 14. In some cases, a set of different minimum and maximum feedback timing values are configured in RRC signaling and an activation DCI indicates which minimum and maximum feedback timing values are to be used. In some cases, the set of different minimum and maximum feedback timing values are provided with the semi-persistent scheduling configuration. In other cases, the set of different minimum and maximum feedback timing values are provided separately from the semi-persistent scheduling configuration (e.g., in separate RRC signaling or in a separate DCI).

At 2120, the base station may receive, from the UE, a block feedback in the uplink resource that indicates feedback for each of the two or more semi-persistent scheduling occasions. The operations of 2120 may be performed according to the methods described herein. In some examples, aspects of the operations of 2120 may be performed by a HARQ manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a base station, a semi-persistent scheduling configuration for a set of semi-persistent scheduling occasions that are scheduled for downlink communications from the base station to the UE; determining feedback for one or more semi-persistent scheduling occasions of the set of semi-persistent scheduling occasions based at least in part on two or more feedback timings for transmission of feedback associated with the one or more semi-persistent scheduling occasions, wherein the two or more feedback timings are associated with a same uplink resource for transmitting block feedback to the base station; and transmitting a block feedback in the uplink resource that indicates the feedback for the one or more semi-persistent scheduling occasions.

Aspect 2: The method of aspect 1, wherein the receiving further comprises: receiving a separate feedback timing for each semi-persistent scheduling occasion within a feedback window associated with the uplink resource.

Aspect 3: The method of any of aspects 1 through 2, wherein a plurality of different feedback timings are configured in RRC signaling.

Aspect 4: The method of aspect 3, further comprising: receiving an activation DCI communication from the base station that activates the semi-persistent scheduling configuration and indicates which of the plurality of different feedback timings are to be used for each semi-persistent scheduling occasion within a feedback window that includes two or more semi-persistent scheduling occasions.

Aspect 5: The method of aspect 4, further comprising: receiving, from the base station, periodic updates to the feedback timings for two or more semi-persistent scheduling occasions within the feedback window.

Aspect 6: The method of any of aspects 1 through 2, further comprising: receiving a DCI communication from the base station that indicates the uplink resource and that indicates the two or more feedback timings for two or more semi-persistent scheduling occasions that are to be reported in the uplink resource.

Aspect 7: The method of any of aspects 1 through 6, wherein the block feedback indicates feedback only for semi-persistent scheduling occasions that have negative-acknowledgment feedback.

Aspect 8: The method of aspect 1, wherein the receiving further comprises: receiving a minimum feedback timing value and a maximum feedback timing value from the two or more feedback timings, and wherein semi-persistent scheduling occasions within the minimum and the maximum feedback timing values are reported in an earliest uplink resource that is available for block feedback.

Aspect 9: The method of aspect 8, wherein the minimum feedback timing value and the maximum feedback timing value are received in radio resource control signaling, and the block feedback is transmitted for semi-persistent scheduling occasions within the minimum feedback timing value and the maximum feedback timing value of the earliest uplink resource.

Aspect 10: The method of any of aspects 8 through 9, wherein the earliest uplink resource is a configured block feedback resource for a group of semi-persistent scheduling occasions or uplink resources associated with a different feedback communication of a dynamically configured uplink resource.

Aspect 11: The method of any of aspects 8 through 10, wherein a plurality of minimum feedback timing values and maximum feedback timing values are configured at the UE and a downlink control information communication from the base station activates one of the plurality of minimum feedback timing values and maximum feedback timing values.

Aspect 12: The method of any of aspects 8 through 11, further comprising: receiving, from the base station, a downlink control information communication that provides an uplink grant associated with the uplink resource when a set of configured uplink resources are unavailable before the maximum feedback timing value of an earliest semi-persistent scheduling occasion that has unreported feedback.

Aspect 13: The method of any of aspects 1 through 12, wherein the block feedback has a fixed payload size based on a number of semi-persistent scheduling occasions with feedback reported in the block feedback, or has a variable payload size based on a number of negative acknowledgments to be reported in the block feedback.

Aspect 14: A method for wireless communication at a base station, comprising: transmitting, to a UE, a semi-persistent scheduling configuration for a set of semi-persistent scheduling occasions that are scheduled for downlink communications from the base station to the UE; and receiving, from the UE, a block feedback in an uplink resource that indicates feedback for two or more semi-persistent scheduling occasions of the set of semi-persistent scheduling occasions, wherein the two or more semi-persistent scheduling occasions are based at least in part on two or more feedback timings for reception of feedback associated with one or more semi-persistent scheduling occasions, and wherein the two or more feedback timings are associated with the uplink resource for the block feedback.

Aspect 15: The method of aspect 14, wherein the transmitting further comprises: providing a separate feedback timing for each semi-persistent scheduling occasion within a feedback window associated with the uplink resource.

Aspect 16: The method of any of aspects 14 through 15, wherein a plurality of different feedback timings are configured in RRC signaling.

Aspect 17: The method of aspect 16, further comprising: transmitting an activation DCI communication to the UE that activates the semi-persistent scheduling configuration and indicates which of the plurality of different feedback timings are to be used for each semi-persistent scheduling occasion within a feedback window that includes two or more semi-persistent scheduling occasions.

Aspect 18: The method of any of aspects 14 through 15, further comprising: transmitting a DCI communication to the UE that indicates the uplink resource and that indicates the two or more feedback timings for two or more semi-persistent scheduling occasions that are to be reported in the uplink resource.

Aspect 19: The method of aspect 14, wherein the transmitting further comprises: providing a minimum feedback timing value and a maximum feedback timing value, and wherein semi-persistent scheduling occasions within the minimum and the maximum feedback timing values are reported in an earliest uplink resource that is available for block feedback.

Aspect 20: The method of aspect 19, wherein the minimum feedback timing value and the maximum feedback timing value are configured in radio resource control signaling, and the block feedback is transmitted for semi-persistent scheduling occasions within the minimum feedback timing value and the maximum feedback timing value of the earliest uplink resource.

Aspect 21: The method of any of aspects 19 through 20, wherein the earliest uplink resource is a configured block feedback resource for a group of semi-persistent scheduling occasions or uplink resources associated with a different feedback communication of a dynamically configured uplink resource.

Aspect 22: The method of any of aspects 19 through 21, wherein a plurality of minimum feedback timing values and maximum feedback timing values are configured at the UE and a downlink control information communication to the UE activates one of the plurality of minimum feedback timing values and maximum feedback timing values.

Aspect 23: The method of any of aspects 14 through 22, wherein the block feedback has a fixed payload size based on a number of semi-persistent scheduling occasions with feedback reported in the block feedback, or has a variable payload size based on a number of negative acknowledgments to be reported in the block feedback.

Aspect 24: An apparatus for wireless communication at a UE, comprising a processor; memory coupled with the processor; and instructions stored in the memory and executable by the processor to cause the apparatus to perform a method of any of aspects 1 through 13.

Aspect 25: An apparatus for wireless communication at a UE, comprising at least one means for performing a method of any of aspects 1 through 13.

Aspect 26: A non-transitory computer-readable medium storing code for wireless communication at a UE, the code comprising instructions executable by a processor to perform a method of any of aspects 1 through 13.

Aspect 27: An apparatus for wireless communication at a base station, comprising a processor; memory coupled with the processor; and instructions stored in the memory and executable by the processor to cause the apparatus to perform a method of any of aspects 14 through 23.

Aspect 28: An apparatus for wireless communication at a base station, comprising at least one means for performing a method of any of aspects 14 through 23.

Aspect 29: A non-transitory computer-readable medium storing code for wireless communication at a base station, the code comprising instructions executable by a processor to perform a method of any of aspects 14 through 23.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a semi-persistent scheduling configuration for a set of semi-persistent scheduling occasions that are scheduled for downlink communications from an access network entity to the UE;
    receiving an activation downlink control information (DCI) communication that activates the semi-persistent scheduling configuration;
    determining feedback for two or more semi-persistent scheduling occasions of the set of semi-persistent scheduling occasions based at least in part on two or more feedback timings for transmission of feedback associated with the downlink communications, wherein the two or more feedback timings include separate feedback timings that are configured in the semi-persistent scheduling configuration for each of the two or more semi-persistent scheduling occasions, and each of the separate feedback timings identify a first time domain uplink resource for transmitting block feedback to the access network entity for the two or more semi-persistent scheduling occasions;
    receiving one or more periodic updates to the feedback timings for the two or more semi-persistent scheduling occasions within a feedback window that includes the two or more semi-persistent scheduling occasions; and
    transmitting the block feedback in the first time domain uplink resource that indicates the feedback for each of the two or more semi-persistent scheduling occasions, wherein the block feedback is in accordance with the updated feedback timings.

2. The method of claim 1, wherein the receiving further comprises:
    receiving a separate feedback timing for each semi-persistent scheduling occasion within a feedback window associated with the first time domain uplink resource.

3. The method of claim 1, wherein a plurality of different feedback timings are configured in radio resource control (RRC) signaling.

4. The method of claim 3, wherein:
    the activation DCI communication indicates which of the plurality of different feedback timings are to be used for each semi-persistent scheduling occasion within the feedback window that includes the two or more semi-persistent scheduling occasions.

5. The method of claim 1, further comprising:
    receiving a downlink control information (DCI) communication that indicates the first time domain uplink resource and that indicates the two or more feedback timings for the two or more semi-persistent scheduling occasions that are to be reported in the first time domain uplink resource.

6. The method of claim 1, wherein the block feedback indicates feedback only for semi-persistent scheduling occasions that have negative-acknowledgment feedback.

7. The method of claim 1, wherein the receiving further comprises:
    receiving a minimum feedback timing value and a maximum feedback timing value from the two or more feedback timings, and wherein semi-persistent scheduling occasions within the minimum and the maximum feedback timing values are reported in an earliest uplink resource that is available for block feedback.

8. The method of claim 7, wherein the minimum feedback timing value and the maximum feedback timing value are received in radio resource control signaling, and wherein the block feedback is transmitted for semi-persistent scheduling occasions within the minimum feedback timing value and the maximum feedback timing value of the earliest uplink resource.

9. The method of claim 7, wherein the earliest uplink resource is a configured block feedback resource for a group of semi-persistent scheduling occasions or uplink resources associated with a different feedback communication of a dynamically configured uplink resource.

10. The method of claim 7, wherein a plurality of minimum feedback timing values and maximum feedback timing values are configured at the UE and a downlink control information communication from the access network entity activates one of the plurality of minimum feedback timing values and maximum feedback timing values.

11. The method of claim 7, further comprising:
    receiving a downlink control information communication that provides an uplink grant associated with the first time domain uplink resource when a set of configured uplink resources are unavailable before the maximum feedback timing value of an earliest semi-persistent scheduling occasion that has unreported feedback.

12. The method of claim 1, wherein the block feedback has a fixed payload size based on a number of semi-persistent scheduling occasions with feedback reported in the block feedback, or has a variable payload size based on a number of negative acknowledgments to be reported in the block feedback.

13. A method for wireless communication at an access network entity, comprising:

transmitting, to a user equipment (UE), a semi-persistent scheduling configuration for a set of semi-persistent scheduling occasions that are scheduled for downlink communications from the access network entity to the UE;

transmitting, to the UE, an activation downlink control information (DCI) communication that activates the semi-persistent scheduling configuration;

transmitting, to the UE, periodic signaling of two or more feedback timings for two or more semi-persistent scheduling occasions within a feedback window that includes the two or more semi-persistent scheduling occasions, wherein the two or more feedback timings are for reception of feedback associated with the downlink communications and include separate feedback timings that are configured in the semi-persistent scheduling configuration for each of the two or more semi-persistent scheduling occasions, and each of the separate feedback timings identify a first time domain uplink resource for a block feedback for the two or more semi-persistent scheduling occasions; and receiving, from the UE, the block feedback in the first time domain uplink resource that indicates the feedback for the two or more semi-persistent scheduling occasions of the set of semi-persistent scheduling occasions, wherein the two or more semi-persistent scheduling occasions are based at least in part on two or more feedback timings for reception of feedback associated with the downlink communications, and wherein the block feedback is in accordance with the signaled feedback timings.

14. The method of claim 13, wherein the transmitting further comprises:
providing a separate feedback timing for each semi-persistent scheduling occasion within a feedback window associated with the first time domain uplink resource.

15. The method of claim 13, wherein a plurality of different feedback timings are configured in radio resource control (RRC) signaling.

16. The method of claim 15, wherein:
the activation DCI communication indicates which of the plurality of different feedback timings are to be used for each semi-persistent scheduling occasion within the feedback window that includes the two or more semi-persistent scheduling occasions.

17. The method of claim 13, further comprising:
transmitting a downlink control information (DCI) communication to the UE that indicates the first time domain uplink resource and that indicates the two or more feedback timings for two or more semi-persistent scheduling occasions that are to be reported in the first time domain uplink resource.

18. The method of claim 13, wherein the transmitting further comprises:
providing a minimum feedback timing value and a maximum feedback timing value, and wherein semi-persistent scheduling occasions within the minimum and the maximum feedback timing values are reported in an earliest uplink resource that is available for block feedback.

19. The method of claim 18, wherein the minimum feedback timing value and the maximum feedback timing value are configured in radio resource control signaling, and wherein the block feedback is transmitted for semi-persistent scheduling occasions within the minimum feedback timing value and the maximum feedback timing value of the earliest uplink resource.

20. The method of claim 18, wherein the earliest uplink resource is a configured block feedback resource for a group of semi-persistent scheduling occasions or uplink resources associated with a different feedback communication of a dynamically configured uplink resource.

21. The method of claim 18, wherein a plurality of minimum feedback timing values and maximum feedback timing values are configured at the UE and a downlink control information communication to the UE activates one of the plurality of minimum feedback timing values and maximum feedback timing values.

22. The method of claim 13, wherein the block feedback has a fixed payload size based on a number of semi-persistent scheduling occasions with feedback reported in the block feedback, or has a variable payload size based on a number of negative acknowledgments to be reported in the block feedback.

23. An apparatus for wireless communication at a user equipment (UE), comprising:
one or more memories storing processor-executable code; and
one or more processors coupled with the one or more memories and individually or collectively operable to execute the code to cause the UE to:
receive a semi-persistent scheduling configuration for a set of semi-persistent scheduling occasions that are scheduled for downlink communications from an access network entity to the UE;
receive an activation downlink control information (DCI) communication that activates the semi-persistent scheduling configuration;
determine feedback for two or more semi-persistent scheduling occasions of the set of semi-persistent scheduling occasions based at least in part on two or more feedback timings for transmission of feedback associated with the downlink communications, wherein the two or more feedback timings include separate feedback timings that are configured in the semi-persistent scheduling configuration for each of the two or more semi-persistent scheduling occasions, and each of the separate feedback timings identify a first time domain uplink resource for transmitting block feedback to the access network entity for the two or more semi-persistent scheduling occasions;
receive one or more periodic updates to the feedback timings for the two or more semi-persistent scheduling occasions within a feedback window that includes the two or more semi-persistent scheduling occasions; and
transmit the block feedback in the first time domain uplink resource that indicates the feedback for each of the two or more semi-persistent scheduling occasions, wherein the block feedback is in accordance with the updated feedback timings.

24. The apparatus of claim 23, wherein the one or more processors are individually or collectively further operable to execute the code to cause the UE to:
receive a separate feedback timing for each semi-persistent scheduling occasion within a feedback window associated with the first time domain uplink resource.

25. The apparatus of claim 23, wherein a plurality of different feedback timings are configured in radio resource control (RRC) signaling, and wherein:
the activation DCI communication indicates which of the plurality of different feedback timings are to be used for each semi-persistent scheduling occasion within the feedback window that includes the two or more semi-persistent scheduling occasions.

26. The apparatus of claim 23, wherein the one or more processors are individually or collectively further operable to execute the code to cause the UE to:
identify a minimum feedback timing value and a maximum feedback timing value from the two or more feedback timings, and wherein semi-persistent scheduling occasions within the minimum and the maximum feedback timing values are reported in an earliest uplink resource that is available for block feedback.

27. An apparatus for wireless communication at an access network entity, comprising:
one or more memories storing processor-executable code; and
one or more processors coupled with the one or more memories and individually or collectively operable to execute the code to cause the access network entity to:
transmit, to a user equipment (UE), a semi-persistent scheduling configuration for a set of semi-persistent scheduling occasions that are scheduled for downlink communications from the access network entity to the UE;
transmit, to the UE, an activation downlink control information (DCI) communication that activates the semi-persistent scheduling configuration;
transmit, to the UE, periodic signaling of two or more feedback timings for two or more semi-persistent scheduling occasions within a feedback window that includes the two or more semi-persistent scheduling occasions, wherein the two or more feedback timings are for reception of feedback associated with the downlink communications and include separate feedback timings that are configured in the semi-persistent scheduling configuration for each of the two or more semi-persistent scheduling occasions, and each of the separate feedback timings identify a first time domain uplink resource for a block feedback for the two or more semi-persistent scheduling occasions; and
receive, from the UE, the block feedback in the first time domain uplink resource that indicates the feedback for the two or more semi-persistent scheduling occasions of the set of semi-persistent scheduling occasions, wherein the two or more semi-persistent scheduling occasions are based at least in part on two or more feedback timings for reception of feedback associated with the downlink communications, and wherein the block feedback is in accordance with the signaled feedback timings.

28. The apparatus of claim 27, wherein the one or more processors are individually or collectively further operable to execute the code to cause the access network entity to:
provide a separate feedback timing for each semi-persistent scheduling occasion within a feedback window associated with the first time domain uplink resource.

29. The apparatus of claim 27, wherein the one or more processors are individually or collectively further operable to execute the code to cause the access network entity to:
provide a minimum feedback timing value and a maximum feedback timing value, and wherein semi-persistent scheduling occasions within the minimum and the maximum feedback timing values are reported in an earliest uplink resource that is available for block feedback.

* * * * *